United States Patent [19]
Foster

[11] Patent Number: 6,003,332
[45] Date of Patent: Dec. 21, 1999

[54] PROCESS AND SYSTEM FOR PRODUCING HIGH-DENSITY PELLETS FROM A GASEOUS MEDIUM

[75] Inventor: Christopher A. Foster, Clinton, Tenn.

[73] Assignee: Cyrogenic Applications F, Inc., Clinton, Tenn.

[21] Appl. No.: 09/085,319

[22] Filed: May 26, 1998

Related U.S. Application Data

[60] Provisional application No. 60/048,207, Jun. 2, 1997.

[51] Int. Cl.[6] .......................................................... F25J 5/00
[52] U.S. Cl. .............................................. 62/601; 62/602
[58] Field of Search ........................... 62/601, 602, 54.3, 62/66, 73, 71

[56] References Cited

U.S. PATENT DOCUMENTS

| | | |
|---|---|---|
| 1,863,377 | 6/1932 | Lockwood . |
| 1,997,151 | 4/1935 | Maiuri . |
| 2,045,754 | 6/1936 | Clark ............................................. 62/602 |
| 2,138,758 | 11/1938 | Eastman . |
| 3,024,009 | 3/1962 | Booth et al. ................................ 62/601 |
| 3,077,081 | 2/1963 | Schnoor . |
| 3,098,361 | 7/1963 | Haase . |
| 3,901,044 | 8/1975 | Vahl . |
| 4,724,677 | 2/1988 | Foster . |
| 4,838,035 | 6/1989 | Carlson et al . |
| 5,129,237 | 7/1992 | Day et al. .................................... 62/73 |
| 5,257,503 | 11/1993 | Rhoades et al. . |
| 5,472,369 | 12/1995 | Foster et al. . |

*Primary Examiner*—William Doerrler
*Attorney, Agent, or Firm*—Michael E. McKee

[57] ABSTRACT

A process and system for producing pellets of high density carbon dioxide or other gases utilize a chamber containing a plurality of cell-like freezing compartments within which ice is to be formed. A gas desired to be frozen into ice is introduced into the chamber while the internal pressure of the chamber is maintained at a level which is below the equilibrium triple pressure of the gas. The temperature of the freezing compartments is lowered to a temperature which is below the equilibrium vapor pressure temperature of the gas at the chamber pressure so that the gas condenses into ice within the compartments. The temperature of the freezing compartments is thereafter raised so that the ice is thereby released from and falls out of the compartments as pellets for collection.

30 Claims, 8 Drawing Sheets

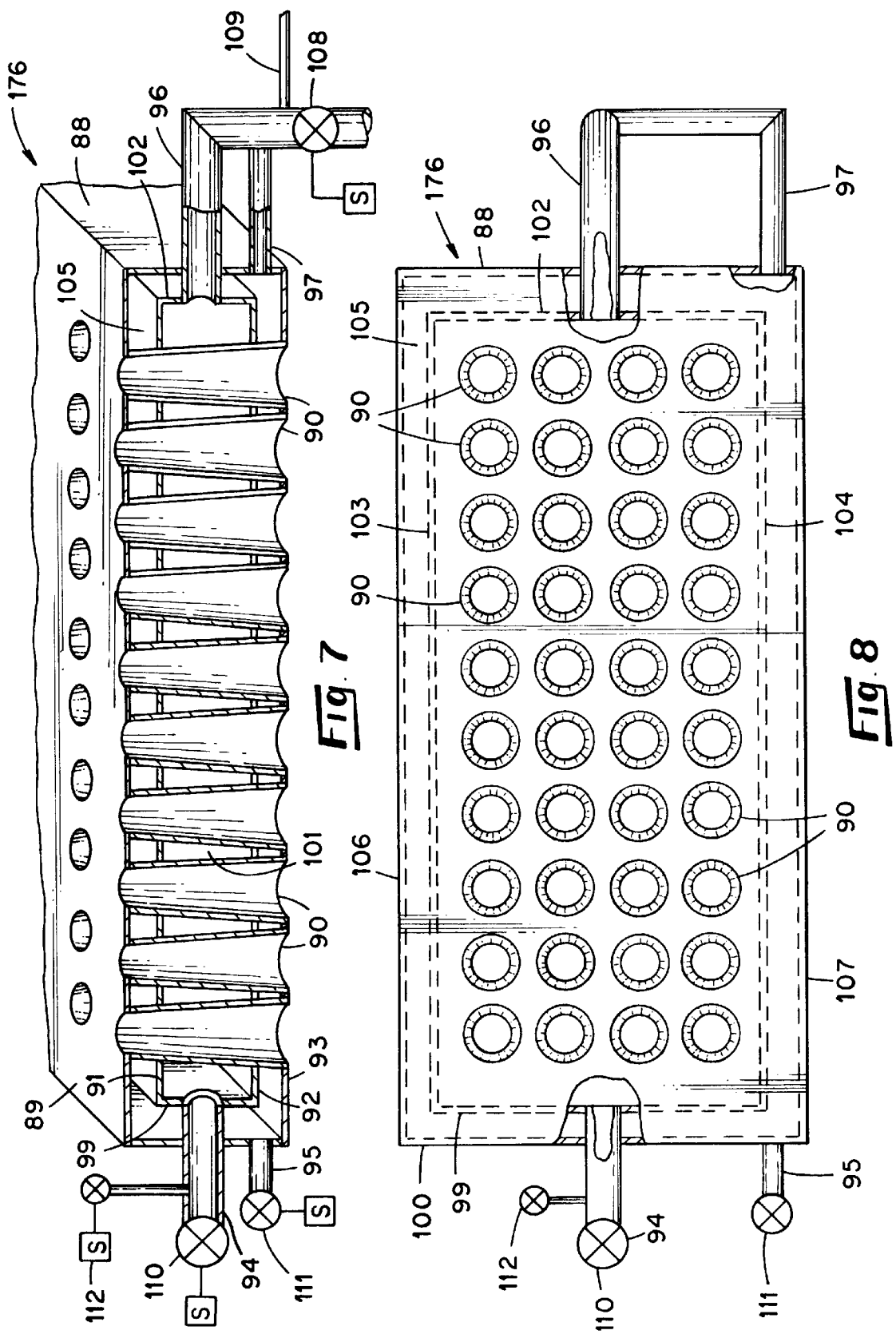

PROCESS AND SYSTEM FOR PRODUCING HIGH-DENSITY PELLETS FROM A GASEOUS MEDIUM

The benefit of Provisional Application Ser. No. 60/048,207, filed Jun. 2, 1997 and entitled A PROCESS AND APPARATUS FOR PRODUCING PELLETS OF HIGH DENSITY CARBON DIOXIDE, is hereby claimed. The disclosure of this referenced provisional application is incorporated herein by reference.

This invention was made with Government support under Grant No. DE-FG05-94ER81734 awarded by the Department of Energy. The Government has certain rights in this invention.

BACKGROUND OF THE INVENTION

This invention relates generally to the production of ice and relates, more particularly, to the production of ice from a medium, such as carbon dioxide, which is gaseous when at room temperature and atmospheric pressure.

Ice, such as dry ice, is commonly used for the refrigeration of food products, for shipping of chilled packages and for use, when combined with compressed air or turbine wheel accelerators, as a blast media for cleaning surfaces.

Prior art processes used to form dry ice pellets of relatively high density commonly involve the flashing of liquid carbon dioxide into solid carbon dioxide snow which is subsequently compacted and formed into pellets via presses, by ram extrusion or by rotary extrusion. The density of the formed pellets formed by these processes is largely dependent upon parameters attending the extrusion step and can approach, but rarely achieves, the maximum density of solid carbon dioxide. Furthermore, the size of the pellets formed in such processes is normally determined by the sizes of the openings provided in plates associated with the extrusion step.

A limitation associated with prior art pellet-forming processes, such as the flashing/pressing technique described above, relates to the fact that only about forty percent of the liquid carbon dioxide is converted to solid while about sixty percent is converted into gas. Consequently, methods have been employed to convert a higher percentage of the liquid carbon dioxide into solid during pellet-forming processes. For example, one method described in U.S. Pat. No. 5,257,503 reclaims the lost carbon dioxide by capturing, compressing and re-liquefying the flash gas. Another method, addressed in each of U.S. Pat. Nos. 1,863,377, 2,138,758 and 3,901,044 involves a refrigeration unit which cools and directly freezes liquid carbon dioxide into solid form in molds, thereby eliminating the flashing step. The freezing of liquid in molds, however, requires the use of relatively complicated mechanisms to release the pellets from the molds. It would be desirable to provide a method and system for producing dry ice pellets in a manner which circumvents any need for or use of liquid carbon dioxide.

Accordingly, it is an object of the present invention to provide a new and improved process and system for producing ice from a process medium which is normally gaseous at room temperature and atmospheric pressure, such as gaseous carbon dioxide.

Another object of the present invention is to provide such a process and system which is capable of converting a relatively high percentage of available gas, such as gaseous carbon dioxide, into solid form, i.e. ice, wherein the solid form possesses a very high density.

Still another object of the present invention is to provide such a process and system which circumvents the need or use of a process medium when in a liquid phase.

Yet another object of the present invention is to provide such a process and system which requires no moving parts which must directly contact the ice forms, such as pellets, during production.

A further object of the present invention is to provide such a method or system which is well-suited for use in a process requiring gas pumping or in some other vacuum pump application.

A still further object of the present invention is to provide such a process and system which is capable of making ice and/or ice pellets of a predetermined shape and size.

SUMMARY OF THE INVENTION

This invention resides in a process and system for freezing a gas into ice.

The process of the invention includes the steps of providing a chamber containing a freezing compartment having at least one surface against which ice is to be formed and introducing a gas to be formed into ice into the chamber while maintaining the internal pressure of the chamber at a level which is below the equilibrium triple pressure of the gas. While the internal pressure of the chamber is maintained as aforesaid, the temperature of the at least one surface of the compartment is lowered to a temperature which is below the equilibrium vapor pressure temperature of the gas at the chamber pressure so that the gas condenses into ice within the compartment and against the at least one surface thereof. Thereafter, the temperature of the at least one surface of the compartment is raised so that the ice is thereby released from the compartment in solid form for collection or use.

The system of the invention includes components for carrying out the process of the invention. For example, the system includes a chamber having a freezing compartment having at least one surface against which the ice is to be formed and means for introducing a gas to be formed into ice into the chamber while maintaining the internal pressure of the chamber at a level which is below the equilibrium triple pressure of the gas. Means are provided for lowering the temperature of the at least one surface of the compartment to a temperature which is below the equilibrium vapor pressure temperature of the gas at the chamber pressure so that the gas condenses into ice within the compartment and against the at least one surface thereof, and means are also provided for raising the temperature of the at least one surface of the compartment following the production of ice against the surface of the compartment so that the ice is thereby released from the compartment for collection or use.

The theory of operation attending the instant invention is not commonly employed to produce ice. For example, common methods for forming ice shapes involve the freezing of a liquid medium into a solid form, such as is routinely performed in conjunction with the making of ice cubes from water, the making of candles from wax, and the casting of metal. In contrast, the present invention produces ice forms by freezing the gas phase of the medium in refrigerated molds at a pressure and temperature below the triple point of the medium.

Briefly, the triple point of a substance is the condition, i.e. a function of temperature and pressure, at which the gas phase, liquid phase and solid phase of a substance can all be in equilibrium. At temperatures and pressures above the triple point, the solid phase will melt into liquid. At temperatures and pressures below the triple point, the liquid phase does not normally exist, and gases condense and evaporate directly to and from the solid phase. The evaporation of a solid below the triple pressure is referred to as sublimation. The reverse process of freezing a gas directly to a solid is referred to herein as reverse sublimation. For many substances, such as nitrogen and hydrogen, the triple point is below atmospheric pressure and room temperature. To freeze these materials directly from the gas phase requires operating in a vacuum chamber at temperatures well below room temperature. Some materials, such as carbon dioxide ($CO_2$) and $UF_6$ have triple points which are well above atmospheric pressure but below room temperature. Ice forms of these materials will sublime when introduced to ambient pressure and temperatures. Alternatively, these materials can be frozen directly to solid when the gas comes into contact with a surface which is colder than the equilibrium vapor pressure temperature at pressures below the triple point.

When refrigerating surfaces are at temperatures well below the equilibrium vapor pressure temperatures of the gas in a chamber, the gas freezes against the refrigerating surfaces into a solid in the form of a frost. This is because the condensing atoms on the refrigerating surfaces are at such low temperature that they cannot migrate to preferred crystal sites before other gas atoms condense thereupon. Consequently, this condensation results in a random solid form with voids. However, at temperatures below but close to the equilibrium vapor temperature, simultaneous evaporation and condensation of the gases occurs at the surfaces which results in the accumulation, or build up, of a clear solid ice on the surface wherein the ice is substantially free of voids and crystalline imperfections. This invention typically operates in this temperature/pressure regime for producing high quality dense ice forms.

The rate at which gases will reverse sublime on a surface, thereby forming a solid layer, is determined by the thermal conductivity of the solid ice, the ice layer thickness, and the temperature difference between the freezing surface and the temperature at the growing surface of the ice. Typically, the surface temperature of the ice rises to a value very close to the equilibrium vapor pressure temperature of the gas in the chamber. The growth rate of ice is proportional to the rate at which the heat of sublimation of the condensing gas is carried to the refrigerating surface, which is the product of the temperature difference times the solid thermal conductivity of the ice divided by the ice thickness.

Gases can be directly frozen in a growing chamber to a solid form at any pressure below the triple pressure. The triple pressure for carbon dioxide is 75 psia, so that it can be reverse sublimated at atmospheric pressure. Since the equilibrium temperature of carbon dioxide at atmospheric pressure is –110° F., a temperature lower than –110° F. would be required for reverse sublimation. For example, a temperature of 120° F. would provide a temperature differential of 10° F. between the ice surface and the freezing surface. By raising the pressure in the growing chamber to a pressure closer to the triple pressure, e.g. about 65 psia, the gas forms into a solid at temperatures below about –70° F., which would require a temperature of –80° F. for a temperature differential of 10° F. Since a refrigeration system operating at a freezing temperature of –80° F. is normally smaller and is more efficient than such a system operating at –120° F., the utilization of a pressurized chamber of the present invention is advantageous in this respect.

A chamber is typically required to grow ice of pure substances so as to contain the desired gas and to exclude air and water vapor from contaminating the solid and fouling the freezing panels with water.

The same general principles of operation used to produce dry ice pellets govern the production of hydrogen ice pellets except that the triple point pressure is 54 Torr (7,200 Pascals) and the triple temperature is 14° K. so that the growing chamber is a vacuum chamber and the freezing surfaces are refrigerated to very low temperatures, typically 10° K.

The process described herein of freezing gas directly into ice produces ice which is optically transparent, similar to glass, which indicates that the solid is devoid of and does not contain unformed pockets and imperfections which would scatter light. This is in contrast to the dry ice formed by compressing snow, which is typically an opaque white solid form of $CO_2$. The clear pellets formed by this invention are thereby denser and harder than pellets produced by prior art techniques, as can be appreciated by the difference in hardness of sleet, which is a dense form of water ice, to snow balls, which are a compressed form of water snow. The harder pellets, when used for example for blasting of surfaces to remove unwanted coatings, are more aggressive and efficient at removing adherent coatings.

In addition, the process of freezing gas directly into ice with this invention converts a high percentage of feed gas to pellets. The conversion efficiency for this process utilizing $CO_2$ is above eighty percent and can approach a theoretical value of over ninety percent. This is in contrast to the machines which flash liquid $CO_2$ to produce snow and then compress the snow into pellets, which converts less than forty percent of the $CO_2$ into pellets. Prior art processes involving a flashing process can increase their efficiency by employing gas recovery systems, but these gas recovery systems are typically effective only in very large installations. The advantages of the high gas-to-pellet conversion efficiency obtained by the process of the present invention is that it reduces cost by reducing the quantity of $CO_2$ required to produce the pellets and that it reduces the release of $CO_2$, which is a greenhouse gas, to the atmosphere.

Still another advantage of the invention is that it requires few moving components in order to produce the frozen pellets. In this connection, the compartments within which the ice pellets are grown in the system of the invention are arranged so that following release of the pellets formed therein, the pellets simply fall from the compartments for collection. In contrast, high pressure extrusion mechanisms associated with prior art techniques for compressing dry ice snow into more compact forms employ many moving parts and are prone to mechanical failure. Furthermore, the prior art technique of freezing liquid $CO_2$ with molds into ice forms commonly require that the molds to be periodically tipped upside down or made to separate in order in order that the ice formed therein be released.

Yet another advantage of the process of this invention relates to the fact that, in addition to use of the invention described herein for the production of frozen pellets from gas, the invention can also be used as a cryogenic process pump or a cryogenic vacuum pump. Cryogenic vacuum pumps (cryopumps) operate by freezing gases into solids on refrigerated surfaces maintained below the equilibrium vapor pressure temperature of the gases being pumped. Typically, conventional cryopumps must be shut down periodically to either defrost or regenerate the pumps. In this connection, the cryopumps are taken out of service, usually by closing an inlet valve, and subsequently warmed so as to evaporate ice which accumulates within the pump during the pumping cycle. As will be apparent herein, the principles of the present invention can be used to cryopump gases into pellets which can be continuously released and ejected from the pump during normal operation, thereby eliminating the need to shut down the pump for regeneration. Accordingly, the principles of the present invention can be variously applied.

Further objects and advantages of my invention will become apparent from a consideration of the drawings and ensuing descriptions.

BRIEF DESCRIPTION OF THE DRAWINGS

FIG. 7 is a longitudinal cross-sectional view of a fragment of an alternative freezing panel assembly.

FIG. 8 is a plan view of the FIG. 7 panel assembly as seen generally from below in FIG. 7.

DETAILED DESCRIPTION OF THE ILLUSTRATED EMBODIMENTS

Figure 1:
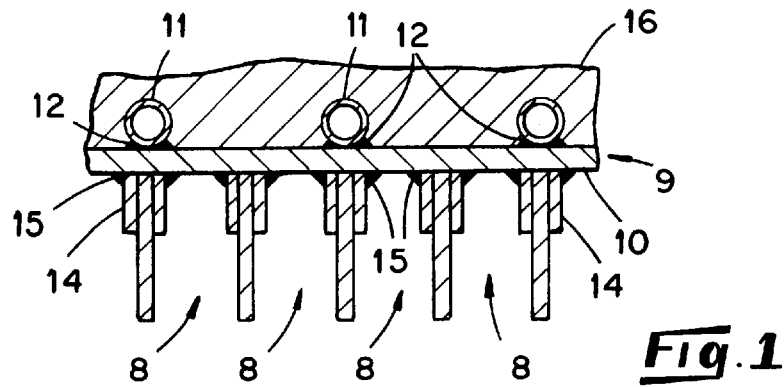
FIG. 1 is a fragmentary cross-sectional view of an exemplary freezing panel assembly used to produce dry ice pellets in accordance with the process of the present invention.
Figure 2:
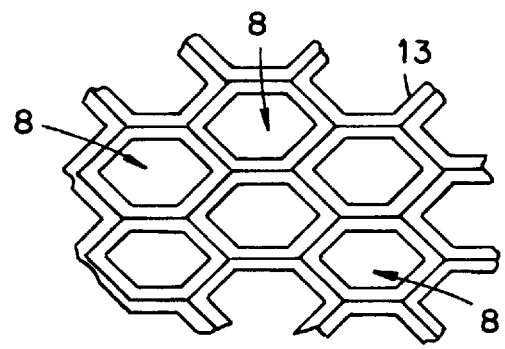
FIG. 2 is a plan view of the FIG. 1 panel assembly fragment as seen generally from below in FIG. 1.

Turning now to the drawings in greater detail, there is illustrated in FIGS. 1 and 2 a freezing panel assembly 9 having a series of freezing compartments, each of which is generally indicated 8, within which ice is formed in accordance with one embodiment of the process of the invention. As will be described herein, each compartment 8 is disposed within a chamber into which a gas, such as carbon dioxide ($CO_2$) is introduced, and the internal conditions of the chamber are controlled so that the gas reverse sublimes against the interior surfaces of the compartments 8 and thereby begins to form ice within the compartments 8. The formed ice continues to accumulate, or build up, on top of itself within the compartments 8 until a desired thickness is achieved, at which time the compartments 8 are defrosted in a manner which releases the formed ice therefrom. It is a feature of the compartments 8 that they are shaped and arranged so that upon release of the ice formed therein, the ice gravitationally falls from the compartments 8 for collection.

In the depicted embodiment of FIGS. 1 and 2, one surface of the compartments 8 are provided by the lower surface of a substantially planar panel 10, and the compartments 8 are designed to produce dry ice pellets having a diameter of about 0.125 inches. The panel 10 can be provided by a round copper plate 10 having a thickness of about 0.0625 inches, a diameter of about seventeen inches and a center hole of about 2.0 inches in diameter. For purposes of controlling the temperature of the lower surface of the panel 10, copper refrigeration coils 11 having an inner diameter of about 0.25 inches are attached in heat transfer relationship to the upper surface of the panel by means of 96-4 tin silver solder 12. Covering the top side of panel 10 and coils 11 is a thermally insulating coating 16 of epoxy resin filled with glass microballoons. As will be apparent herein, refrigerant is directed through the coils 11 by way of a suitable refrigerating system for controlling the temperature of the panel 10, and the insulating coating 16 retards the growth of ice against the upper surface of the panel assembly 9.

The sides of the compartments 8 are provided by a honeycomb 13 which is attached to the underside of the plate 10 by means of 96-4 tin silver solder 15. The honeycomb 13 is constructed of spot-welded 304 stainless steel foil having a cell size of 0.125 inches, a foil thickness of 0.004 inches and a cell depth of 0.5 inches. A honeycomb having the aforedescribed dimensions is available from Kentucky Metals Inc. of New Albany, Ind. Prior to soldering the honeycomb 13 to the panel 10, the honeycomb 13 is plated with copper plating 14 so that the copper plating 14 covers at least about the upper 0.125 inches (as viewed in FIG. 1) of the surfaces of the honeycomb 13 which are ultimately soldered to the panel 10.

It follows that the each compartment 8 is provided by a portion of the lower surface of the panel 10 and the interior surfaces of the walls of a corresponding cell of the honeycomb 13. During the growth of an ice pellet within a honeycomb cell, carbon dioxide preferentially deposits upon the copper surfaces of the honeycomb, rather than the uncoated (exposed) surfaces of the stainless steel honeycomb due to the higher rate of heat transfer through the copper than through the stainless steel. In other words, with the aforedescribed design, the $CO_2$ ice is likely to form more quickly on the copper surfaces than on the uncoated (exposed) surface of the stainless steel to reduce that likelihood that ice will bridge across the wall of adjacent honeycomb cells before the ice pellets achieve a desired size within a cell.

Figure 3:
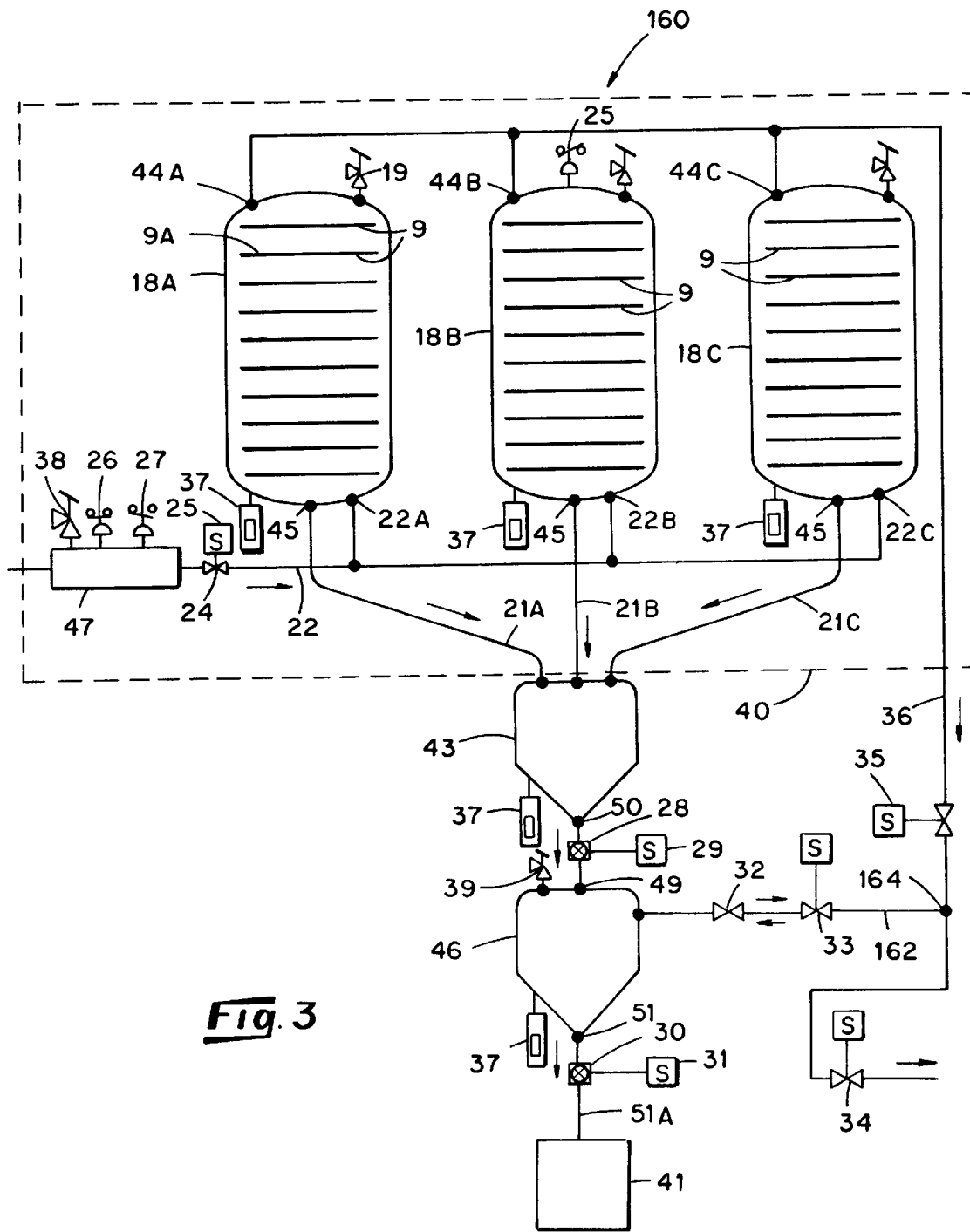
FIG. 3 is a schematic view of an embodiment of a system within which the chamber of FIG. 4 is utilized.

The panel assembly 9 of FIGS. 1 and 2 is utilized with panel assemblies of like construction in a pellet-making and handling system 160, schematically shown in FIG. 3 used for making dry ice pellets from carbon dioxide. To this end, the system 160 includes three cylindrical chambers 18A, 18B and 18C which are each about 18.0 inches in diameter, about 32.0 inches high, and constructed of a welded ten gauge 304 stainless steel tube with ten gauge flanged and dished header domes welded to the top and bottom of the tube. Each chamber 18A, 18B or 18C has a pressure rating of 95 psig and is equipped with a relief valve 19 which is set to open at 75 psig.

Figure 4:
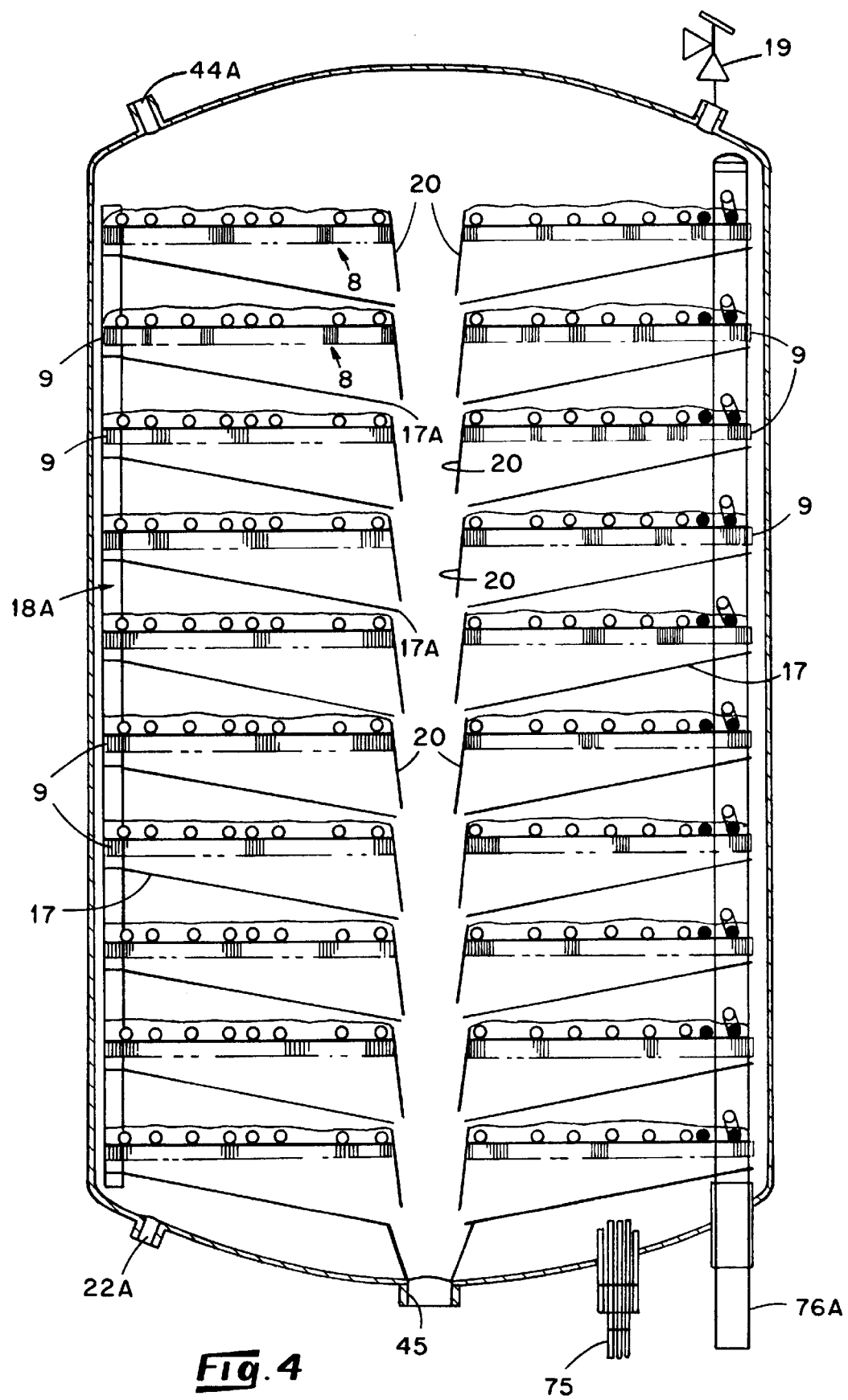
FIG. 4 is a cross-sectional view of a chamber within which the panel assembly of FIG. 1 is utilized.

As depicted by the chamber 18A of FIG. 4, each chamber 18A includes a plurality of panel assemblies 9 supported in stacked relationship therein, and each panel assembly 9 is supported within its corresponding chamber so that its freezing compartments 8 open downwardly. As will be apparent herein, this downward opening of the compartments 8 permits gravity to facilitate the release of the ice pellets from the compartments 8. In addition, a catch funnel 17 is positioned beneath each freezing panel assembly 9 for directing the ice pellets which are eventually released from the panel assemblies 9 to a central opening 17A provided in the funnel 17 for collection. Each catch funnel 17 is constructed of polished twenty-six gauge 304 stainless steel and is separated from the honeycomb of its corresponding panel assembly 9 by a spacing of at least 0.5 inches. Preferably, as many panel assemblies 9 are positioned within the chambers 18A, 18B and 18C as is as practically possible to take full advantage of the internal volume of the chambers 18A, 18B and 18C.

With reference again to FIG. 4, there is attached to each panel assembly 9 at its central opening a relatively short sleeve 20 which depends downwardly from the panel 10. These sleeves 20 collectively provide a vertical funnel stack which funnels dry ice pellets delivered thereto by the catch funnels 17 downwardly toward the bottom of the chambers 18A, 18B and 18C. With reference again to FIG. 3, a pipe 21A, 21B or 21C is joined between the bottom of each chamber 18A, 18B and 18C and the top of a pellet collection hopper 43 so that pellets which fall to the bottom of each chamber are gravitationally directed into the collection hopper 43. Accordingly, the hopper 43 is disposed below the elevation of the bottom of the chambers 18A, 18B and 18C. Each pipe can be provided by a copper tube having an internal diameter of 0.8 inches, and its opposite ends are joined, respectively, to the bottom of a chamber 18A, 18B and 18C and the collection hopper 43 by way of suitable couplings.

In addition, each chamber 18A, 18B and 18C is provided with a gas exhaust port in its top, and 0.25 inch ID couplings 44A, 44B and 44C are joined to these exhaust ports. One chamber 18B is provided with a pressure switch 25. Further still, a pneumatic piston vibrator 37 is attached to the bottom of each chamber 18A, 18B and 18C. During the production of dry ice pellets, the vibrators 37 enhance the flow of pellets toward and out of the bottom of the chambers.

Associated with the system 160 is a gas supply tank 47 for supplying carbon dioxide, under pressure, to the chambers 18A, 18B, and 18C and a supply piping network for delivery of the carbon dioxide to the chambers 18A, 18B and 18C. This supply piping network includes a 0.25 inch ID supply pipe 22 leading from the tank 47 to inlet pipe segments 22A, 22B and 22C (0.25 ID) which join the supply pipe 22 to the bottom of a corresponding chamber 18A, 18B and 18C by suitable couplings. A gas feed solenoid valve 24 is connected in-line with the supply pipe 22.

The gas supply tank 47 is equipped with a relief valve 38 set at 150 psig, a high pressure switch 26 set at 90 psig and low pressure switch 27 set at 70 psig. By way of example, the tank 47 can be constructed of Schedule 10 304 stainless steel having Schedule 10 pipe caps welded to each end and measure 44.0 inches in length and 6.0 inches in diameter.

Preferably, the supply tank 47 and the chambers 18A, 18B and 18C are positioned within a insulated box 40 (depicted in dotted lines in FIG. 3) constructed of a 304 SS angle frame which is enclosed on all sides by twenty gauge stainless steel panels and rigid urethane foam insulation having a thickness of 2.0 inches.

The pellet collection hopper 43 positioned below the chambers 18A, 18B and 18C is situated outside of the insulated box 40 and is constructed, for example, of a 10.0 inch diameter 304 SS F&D top tank head welded to a 10.0 inch diameter, twelve gauge cylinder. This cylinder is about 6.0 inches long and is welded to a twelve gauge, 45° sidewall funnel having a 1.0 inch pipe outlet 50. The hopper 43 is insulated with thick rubber foam having a thickness of about 0.75 inches and is connected to the bottom outlet 45 of the chambers 18A, 18B and 18C by way of the aforementioned tubes 21A, 21B and 21C. Each tube 21A, 21B and 21C can consist of 0.875 inch OD copper tubing with flare-to-pipe adaptor couplings at its ends. Preferably, each tube 21A, 21B and 21C is insulated with rubber foam having a thickness of about 0.5 inches.

With reference still to FIG. 3, there is positioned below the collection hopper 43 a pellet release hopper 46 which has the same construction and dimensions as the collection hopper 43 except that the hopper 46 has a single 1.0 inch ID central pipe inlet 49 instead of three. In addition, a 1.0 inch ID pipe pellet discharge outlet 51 is joined to the bottom of hopper 46 through which pellets are dispensed from the release hopper 46. Connected between the bottom outlet 50 of hopper 43 and the inlet 49 of hopper 46 is a ball transfer valve 28 which is a 1.0 inch full-ported pneumatically operated valve with a four-way pneumatic control valve 29. Attached to the outlet 51 of the release hopper 46 is a conduit 51A having a 1.0 inch ID pneumatic ball pellet discharge valve 30 with a four-way solenoid control valve 31 mounted therein. For receiving the pellets which are discharged from the hopper 46 by way of the conduit 51A, an insulated storage chest 41 is positioned beneath the release hopper 44. If desired, a vibrator 37 can be mounted on the bottom of the hoppers 43 and 46 to facilitate the removal of pellets therefrom.

Associated with the hopper 46 is a pressure relief valve 39 mounted in the top thereof, and the valve 39 is preset to open at 75 psig. Also connected to the top of hopper 46 is a needle throttle valve 32 which is connected to a gas solenoid valve 33. The gas solenoid valve 33 is, in turn, connected to a gas vent solenoid valve 34. One end of a pipe 36 which is connected in flow communication to each of the exhaust ports 44A, 44B and 44C is connected in the pipe 162 extending between valves 33 and 34 by way of a Tee-fitting 164. Mounted in-line with the pipe 36 is a chamber discharge valve 35.

Figure 5:
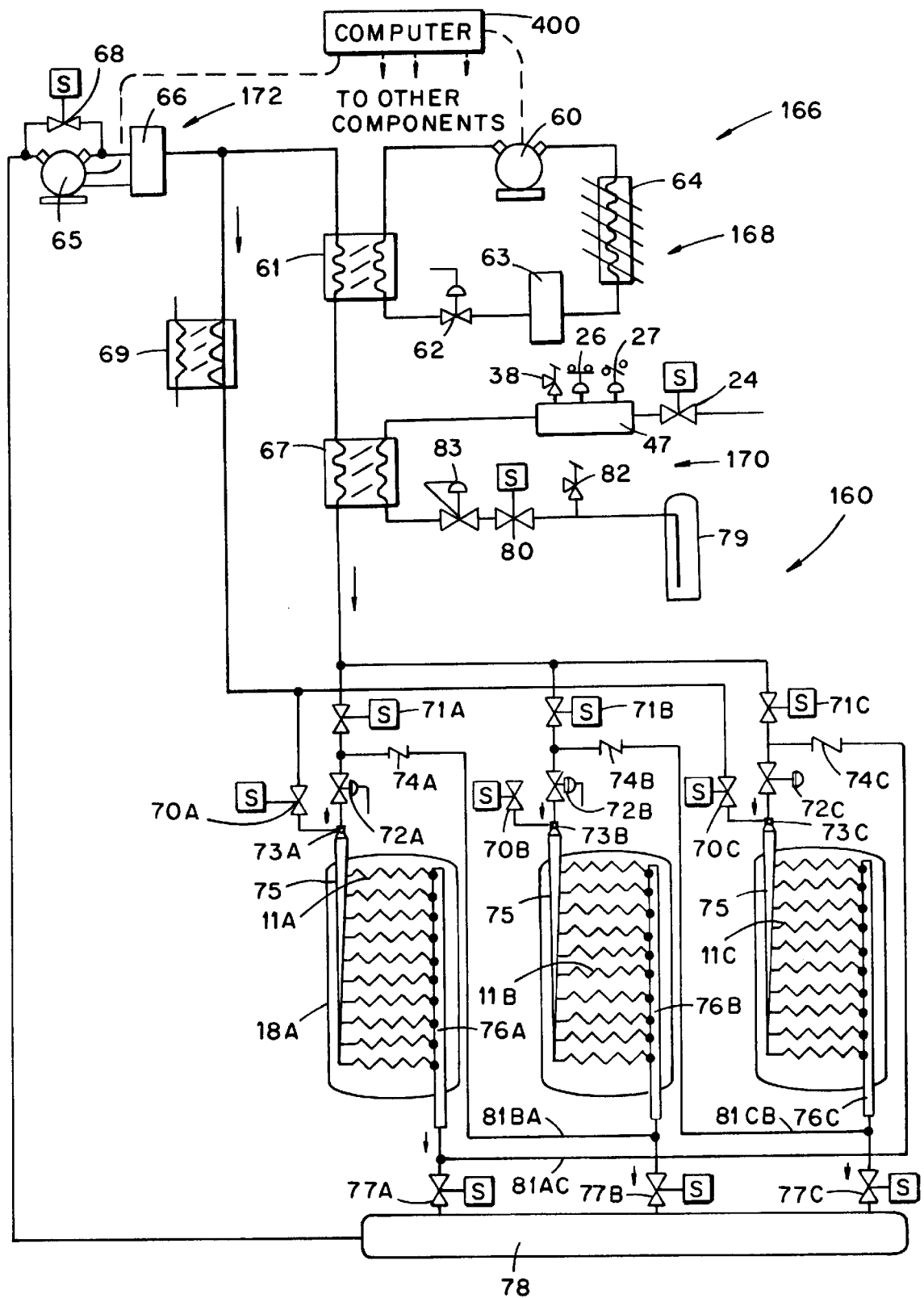
FIG. 5 is a view illustrating schematically the cascade refrigeration system utilized by the system of FIG. 3.

For purposes of controlling the temperature of the freezing panel assemblies 9 within the chambers 18A, 18B and 18C and with reference to FIG. 5, the system 160 includes a cascade refrigeration system, generally indicated 166, whose coldest-operating refrigeration coils include the coils 11 of the pellet freezing panels 9A, 9B, 9C. As will be apparent herein, the refrigerant pumped through the coils 11 is responsible for the growth of the pellets within the compartments 8 during one (i.e. a growth) phase of the pellet-producing operation and is also responsible for the release of the grown pellets from the compartments 8 during another (i.e. a release) phase of the pellet-producing operation.

The construction and operation of a cascade refrigeration system like that of the refrigeration system 166 (capable of production of temperatures as low as about −110° F.) are known so that a detailed description of the system 166 is not believed to be necessary. Briefly, however, the system 166 includes three refrigeration loops, or subsystems 168, 170 and 172, wherein the heat of solidification of $CO_2$ absorbed (in the chambers) by the low-end of the loop is removed by the high-end loop and intermediate-temperature loop. One subsystem 168 (i.e. the high-end loop) uses R404A as a refrigerant and a five-horsepower scroll compressor 60 suitable for pumping the R404A refrigerant. The outlet of compressor 60 is connected to an air-cooled heat exchanger 64, which in turn is connected to a refrigerant receiver 63. The receiver 63 is connected to thermostatic expansion valve 62 which is connected to an R404A/R508B plate/plate heat exchanger 61. The outlet of 61 is connected to the compressor 60 suction inlet completing the high end refrigeration loop.

A second subsystem 170 (i.e. the intermediate loop) of the cascade system 166 is an open loop arrangement which uses liquid $CO_2$ as a refrigerant and produces the $CO_2$ gas for freezing into ice within the chambers 18A, 18B and 18C. Associated with this subsystem 170 is a liquid $CO_2$ supply tank 79 provided with a pressure relief valve 82 set at 400 psig and having a tank outlet which is connected to a liquid $CO_2$ solenoid valve 80. The valve 80 is connected to a downstream pressure regulating valve 83 which is set at 90 psig and which is connected to a $CO_2$/R508B plate/plate heat exchanger 67. The $CO_2$ outlet of heat exchanger 67 is connected to the $CO_2$ gas supply tank 47 (see also FIG. 3).

The remaining subsystem 172 (i.e. the low-temperature loop) of the cascade system 166 uses R508B (DuPont SUVA 95) as a refrigerant and a four-horsepower scroll compressor 65 capable of pumping the R508B refrigerant. The outlet of the compressor 65 is connected to a normally-open bypass solenoid valve 68 (which is closed during operation), which in turn is connected to the suction inlet of the compressor 65. The outlet of compressor 65 is also connected to an oil separation filter 66. The oil filter 66 has an oil return outlet which is connected to the oil return inlet of compressor 65 and has a gas outlet which is connected to the R508B/R404A heat exchanger 61. The heat exchanger 61 is connected to the R508B/$CO_2$ heat exchanger 67 for flow of the R508B refrigerant thereto, and a piping network is joined between the heat exchanger 67 and the chambers 18A, 18B and 18C for flow of the R508B refrigerant from the heat exchanger 67 to the chambers 18A, 18B and 18C. Refrigerant solenoid valves 71A, 71B or 71C, one for each freezing chamber 18A, 18B, 18C, are disposed within this piping network for control of the refrigerant to the chambers.

Each of the refrigerant solenoid valves 71A, 71B or 71C is connected to an R508B TEV (thermostatic expansion valve) 72A, 72B, 72C, and each TEV valve 72A, 72B or 72C is connected to a corresponding liquid distributor 73A, 73B or 73C. Each distributor 73 is connected in-line with each of ten panel refrigeration coils 11 (corresponding to the number of freezing panel assemblies mounted in each chamber 18A, 18B or 18C) by way of capillary tubes 75 (FIGS. 4 and 5) so that refrigerant routed through the distributor 73A, 73B or 73C is delivered to every coil 11 of a corresponding chamber. Each coil 11 is connected to a corresponding suction line 76A, 76B or 76C which, in turn, is connected to a suction solenoid valve 77A, 77B or 77C. Each suction valve 77A, 77B or 77C has an outlet which is connected to inlets of an R508B gas expansion tank 78, and the tank 78 has an outlet which is connected to the suction inlet of the R508B compressor 65 thereby completing the R508B refrigeration loop.

The subsystem 172 further includes defrost cycle components includes a two-Kilowatt electric gas heater 69 to which the gas outlet of oil filter 66 is connected, and the outlet of gas heater 69 is connected to a hot gas solenoid valves 70A, 70B and 70C. Each hot gas valve 70A, 70B or 70C is connected to the gas inlet of a corresponding distributor 73A, 73B or 73C. In addition, a capillary tube 81AC is joined between a location in the loop downstream of the suction line 76A and a location disposed between valves 71C and 72C; a capillary tube 81BA is joined between a location in the loop downstream of the suction line 76B and a location disposed between valves 71A and 72A; and a capillary tube 81CB is joined between a location in the loop downstream of the suction line 76C and a location disposed between valves 71B and 72B. A flow check valve 74A, 74B or 74C is connected in-line with each capillary tube 81AC, 81BA and 81BC. Preferably, each capillary tube 75, as well as the suction manifold 76A, 76B and 76C is coated with a suitable insulating layer to reduce the likelihood of growth of ice upon the surfaces of these components.

During a pellet-making operation within a chamber 18A, 18B or 18C, the valve 70A, 70B or 70C is closed and the corresponding valve 71A, 71B or 71C and suction valves 77A, 77B and 77C are opened so that the R508B refrigerant of the subsystem 172 is directed through the coils 11 of the freezing panel assemblies 9 so that ice is formed in the compartments 8 thereof. To subsequently release the grown pellets from the compartments 8 of a chamber 18A, 18B or 18C, the valve 71A, 71B or 71C and suction valves 77A, 77B and 77C are closed and the corresponding valve 70A, 70B or 70C is opened so that heated R508B refrigerant from the defrost loop of the subsystem 172 is directed into and condenses in the coils 11 of the freezing panel assemblies 9 to raise the temperature of the panel assemblies 9 to a condition at which the ice sublimes at the surfaces of the compartments 8 and thereby releases the pellets from the compartments 8. As will be apparent herein, by controlling the opening and closing of the valves 70A, 70B, 70C, 71A, 71B, 71C, 77A, 77B and 77C, two of the chambers can be made to undergo a pellet-production phase at any one period of time while the remaining chamber can be made to undergo a pellet-release phase so that pellets are continually produced by the system 160.

Figure 6:
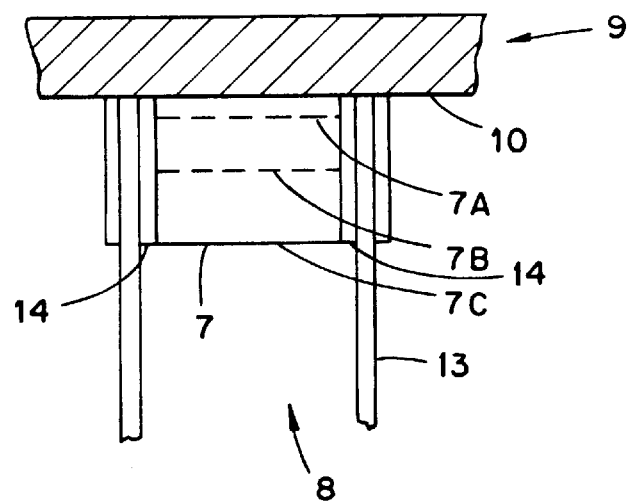
FIG. 6 is a view similar to that of FIG. 1 of the FIG. 1 panel assembly but drawn to a slightly larger scale and depicting the growth of an ice pellet formed in the panel assembly.

With reference to FIG. 6, there is depicted the growth of an ice pellet, indicated 7, within a freezing compartment 8 over a period of time. For example, soon after the pellet has begun to grow within the compartment 8, its thickness is quite small and its lowermost surface corresponds with a level, designated 7A, which is relatively close to the lower surface of the panel 10. When the ice pellet is about one-half grown, its thickness is increased so that its lowermost surface corresponds with a level, designated 7B, which is further from the panel 10 than is the level 7A; and when the pellet is grown to its desired thickness, its lowermost surface corresponds with a level, designated 7C, which is appreciably spaced from the panel 10. It will be understood that as the pellet 7 is grown within the compartment 8, its surfaces cling to the interior surfaces of the compartment 8 so that the pellet 7 remains affixed therein until released in a manner described herein.

During the startup of the machine 160 from room temperature, a startup cycle is used to purge the chambers 18A, 18B and 18C of air and to aid the startup and cooldown of the cascade refrigeration system 166. During this startup cycle, gas valve 24 is cycled with exhaust valve 35 and vent valve 34 to cyclically pressurize and de-pressurize the chambers. The purging of the chambers is aided in part by the placement of the gas supply ports (to which the pipe segments 22A, 22B and 22C are connected) at the bottom of the chamber and the exhaust ports 44 at the top of the chambers since the $CO_2$ (being heavier than air) which is introduced through the supply ports displaces the air in the chambers.

In addition, the refrigeration compressor 60 of the subsystem 168 is started during this start-up phase to allows the R508B refrigerant to pre-condense in the heat exchanger 61 by passing through the bypass valve 68. Once the pressure of the R508B refrigerant is lowered below 150 psig, the compressor 65 is then turned on and the bypass valve 68 is closed, thereby initiating the cool-down of panel assemblies 9 within the chambers. During cool-down of the panel assemblies 9, refrigerant valves 71A, 71B or 71C are turned on and off with a duty cycle sufficient to prevent an over-pressure trip of the compressor 65. When the panel assemblies 9 reach a temperature of approximately −50° F., the normal refrigeration/defrost (i.e. pellet-producing/pellet-release) cycles are started. This startup and cool-down process takes approximately twenty minutes.

Gas is delivered to each chamber 18A, 18B and 18C from the supply tank 47 (which contains about one cubic foot of $CO_2$ gas at 90 psig) by way of the solenoid valve 24. Operation of the solenoid valve 24 is controlled by the adjustable pressure switch 25, which is set to the desired operating pressure of chambers 18A, 18B and 18C. A typical chamber operating pressure of the chambers is 45 psig, which is well below the triple pressure of $CO_2$, which is 60 psig. From the gas feed valve 24, the gas is fed into chambers where it freezes within the compartments 8 in a condensation or reverse-sublimation process.

At a given time during the pellet-production phase of the operation, the ice forming in the compartments 8 of the panel assemblies 9 of any single chamber will be at approximately the same stage of growth. Early during the ice-growing stages, the ice forms primarily against the underside of the panel 10 and on the lower parts of the copper plating 14. Later in time, the ice continue to grow in thickness as additional $CO_2$ freezes against the ice already formed in the compartments 8. When the ice has accumulated within each compartment 8 to thereby form a pellet of desired size, the panel assemblies 9 are switched to a defrost mode to initiate the release of the pellets from the compartments 8. Pellets are considered to be fully grown when the thickness thereof corresponds to the length of the copper plating 14 along the sides of the honeycomb 13. This way, the ice pellet which grows in one compartment 8 does not connect or bridge to the pellet which grows in an adjacent compartment 8 before it is released therefrom.

Because the $CO_2$ gas freezes in the compartments 8 directly from the gas phase to a solid phase within the chambers, the downwardly-opening orientation of the compartments 8 do not adversely affect the growth of the ice pellets therein. If the pressure of the growing chamber was above the triple pressure, liquid $CO_2$ would condense on the panel assemblies 9 and run and drip out of the compartments 8. By comparison, to prevent liquid carbon dioxide from running out of the freezing molds, the liquid-to-solid systems of the prior art utilized upright molds which required mechanisms to either invert or separate the molds to facilitate the release of the ice forms.

To initiate the defrosting of the panel assemblies 9 in a selected chamber, such as chamber 18A, the flow of refrigerant from the heat exchanger 67 through the coils 11 of the chamber 18A (designated 11A in FIG. 5) is shut off (by closing the valve 71A) and the flow of heated refrigerant from the heater 69 to the coils 11A is permitted (by opening the corresponding valve 70A) and the flow of gas from the suction manifold 76A is shut off by closing the suction valve 77A. The R508B refrigerant entering the coils 11A of the chamber 18A condenses therein thereby raising the temperature of the panel assemblies 9 (of the chamber 18A) to a temperature which is above the equilibrium vapor temperature of the $CO_2$ gas in the chamber. The flow of the condensed refrigerant R508B proceeds through the capillary tube 81AC to check valve 74C through TEV 72C distributor 73C capillary tubes 75 and is evaporated in the coils 11C thereby refrigerating coils 11C in a chamber which is in the refrigeration, or ice-producing, phase.

As the temperature of panel assemblies 9 rises above the vapor pressure equilibrium temperature, the ice at the interface of panel 10 is evaporated, causing the ice to be both physically and thermally detached from the panel 10. Heat from panel 10 can then flow down the plating 14 and eventually onto the steel, unplated surface of the honeycomb 13 thereby separating the rest of the ice from the compartment 8. When the pellet is fully separated from the surfaces of the compartment 8, it falls from the compartment 8 and onto the funnel surface 17 (FIG. 4) before being guided toward the bottom of the chamber for collection. Upon exiting the chamber bottom, the pellets move through the transfer tubes 21A, 21B and 21C into the hopper 43. The flow of pellets from the chambers can be aided by the operation of the vibrators 37.

Once the defrost cycle is completed, the refrigeration of panel 10 is turned back on by closing the valve 70A, 70B or 70C and opening the valve 71A, 71B or 71C and valves 77A, 77B, 77C so that the temperature of the panel assemblies 9 is returned to a temperature (e.g. −85° F.) which is below the equilibrium vapor temperature of the $CO_2$ gas within the chamber, to begin growth of a new batch of pellets therein.

By providing an appropriate control scheme for controlling the sequential opening and closing of the valves 70A, 70B, 70C, 71A, 71B, 71C, 77A, 77B and 77C, pellets can be continually produced by the three chambers 18A, 18B and 18C. In this connection, the ratio of time necessary to make a pellet of desired size to the time necessary to defrost (and thereby release) the pellets is about two to one. Consequently, the operation of the valves 70A, 70B, 70C, 71A, 71B, 71C, 77A, 77B and 77C can be controlled to maintain two of the chambers in a pellet-producing mode while the third chamber is in a defrost mode. At the end of the defrost mode, the third chamber is returned to a pellet-producing mode while a defrost phase is initiated in one of the other two chambers. It follows that while one of the chambers is in a defrost mode for releasing pellets for collection, the remaining chambers are in a pellet-producing mode. For purposes of accurately controlling the actuation of the valves 70A, 70B, 70C, 71A, 71B, 71C, 77A, 77B and 77C and thereby controlling the sequencing of the pellet-producing and defrost modes of the chambers (as well as the operation of the cascade refrigeration system and pellet-handling operations), a control computer 400 (FIG. 5) having a microprocessor based programmable logic controller (PLC) is provided within the system 160 and operatively connected to the solenoid valves and operating components of the system for receiving command signals generated therefrom. To this end, the PLC has provisions for up to twenty-four 110 V AC relay outputs which are connected to each of the solenoid valves and motor-contactors in the system.

Gas is created by sublimation during the release of the pellets from the freezing panels 9 during the defrost cycle, and this released gas can flow with the pellets from one chamber through a transfer tube 21A, 21B or 21C into the hopper 43. However, upon reaching the hopper 43, this gas is permitted to return to the interior of the other chambers (which are undergoing a pellet-producing phase) by way of the other transfer tubes 21B, 21C or 21A. Thus, the $CO_2$ gas which is evaporated within one chamber during a defrost cycle, is permitted to be re-frozen in the other chambers undergoing a pellet-producing cycle.

The pellets collected in hopper 43 are periodically discharged into and out of the discharge hopper 46 by way of the transfer valve 28 and discharge valve 30 combined with valves 32, 33, 34, and 35. This pellet discharge operation can be controlled independently of the pellet-production cycle and functions as follows. With the valve 28 closed, pellets collect in the hopper 43. When the hopper 43 is filled to a desirable level, the pellets are thereafter transferred to the hopper 46. With discharge valve 30 closed, the transfer is accomplished by first opening valves 35 and 33 thereby allowing the hopper 46 to fill with $CO_2$ gas and equilibrate in pressure with the chambers 18A, 18B and 18C and the hopper 43. The valve 28 is then opened, by activating solenoid valve 29, for a time sufficient to empty hopper 43. The flow of the pellets in hopper 43 through valve 28 can be aided by operation of the associated vibrator 37. Valve 28 is then closed, thereby trapping the pellets in the hopper 46. Valve 35 is then closed, and valves 33 and 34 are opened thereby allows $CO_2$ gas to vent out of hopper 46 at a rate controlled by needle valve 32.

The hopper 46 is preferably de-pressurized slowly since during this pellet transfer operation, the pellets drop in temperature from the growing equilibrium temperature of −75° F. (before de-pressurization) to the atmospheric pressure equilibrium temperature of −110° F. During this process, approximately 5% of the mass of the pellets in hopper 46 is lost by sublimation. If the hopper 46 is rapidly de-pressurized, the pellets tend to crack due to a temperature differential created between the interior of the pellets and the pellet surface during rapid de-pressurization which because of thermal contraction forces, fractures the ice. However, by de-pressurizing the hopper 46 relatively slowly, this fracturing of the pellets does not occur. If, of course, it is desirable to induce the pellets to crack into smaller pieces, the valving could be adjusted to effect rapid de-pressurization and thereby produce cracked ice.

Once the hopper 46 is de-pressurized to the desired pressure level, the discharge valve 30 is opened by the control solenoid valve 31 and the pellets are emptied from the hopper 46 through the valve 30 into the storage chest 41. While the valve 30 is opened, the hopper 46 is purged with $CO_2$ bleed gas to prevent air from entering the hopper 46. This is done by closing the vent valve 34 and opening valves 33 and valve 35, thus allowing $CO_2$ from the chambers to flow through the hopper 46 at a rate controlled by the needle valve 32.

Once the pellets are emptied from the hopper 46, the release valve 30 is closed while valve 33 and 35 remain open, thus re-pressurizing hopper 46, and thereby completing the pellet discharge cycle.

The hopper 46 is equipped with a pressure relief valve 39 set at 75 psig to prevent over-pressurization. The pneumatic ball valves 28 and 30 are operated by using $CO_2$ gas from the gas supply tank 47 since operation of the valve actuators below 32° F. would freeze out moisture present in a compressed air system. The pressure switch 26 associated with the gas tank 47 is used to control the liquid $CO_2$ supply valve 80 (of the intermediate subsystem 170) to thereby control the pressure in the tank 47. Meanwhile, the low pressure switch 27 of the tank 47 (set at 70 psig) is used to ensure that the pressure in the tank 47 and the heat exchanger 67 is maintained above the triple pressure so that the liquid $CO_2$ does not freeze up within the subsystem 170. The low pressure switch 27 is connected with the control gas supply valve 24, so that if the tank 47 pressure falls to the set point of switch 27, the valve 24 is prevented from opening.

The aforedescribed cascade refrigeration system 166 (FIG. 5) possesses the capacity necessary to remove the heat of solidification of the $CO_2$ ice growing in the compartments 8 of the freezing panel assemblies 9, while maintaining the temperature of the freezing panel assemblies 9 below the vapor equilibrium temperature of the $CO_2$ gas in the chambers 18A, 18B and 18C. To this end, the cascade system 166 is designed to provide approximately 24,000 BTU/h of refrigeration at −80° F. More specifically, the high temperature loop 168 has a capacity of approximately 30,000 BTU/h at −10° F. for cooling and partially condensing the R508B refrigerant exhausting from the low temperature system compressor 65. The R404A subsystem 170 is similar to the refrigeration systems used in commercial freezers in that it utilizes a 5 HP scroll compressor 60 with an air cooled condenser 64, and the 404A refrigerant is stored in a receiver 63. In operation, liquid refrigerant is evaporated in the R508B/R404A plate/plate heat exchanger 61, and the flow of the R404A refrigerant flow is controlled by the TEV valve 62.

The intermediate temperature subsystem 170 is used to complete the condensation of the R508B refrigerant and sub-cool the R508B refrigerant to approximately −40° F. In addition and as mentioned earlier, this subsystem 170 also provides a dual use of evaporating liquid $CO_2$ to provide gas to the supply tank 47 for the eventual production of pellets within the chambers. The utilization of liquid $CO_2$ as a feedstock for the system 160, rather than $CO_2$ gas, is advantageous because of the fact that liquid $CO_2$ is a readily available commodity. However, if it is desired to produce a pelletizing system which utilized gaseous $CO_2$ as a feedstock, a cascade refrigeration system could be designed without the intermediate liquid $CO_2$ stage by increasing the refrigeration capacity of the 404A stage.

With reference again to the depicted system 160, the liquid $CO_2$ refrigeration subsystem 170 withdraws liquid $CO_2$ from the storage tank 79 wherein the liquid $CO_2$ is typically stored at pressures of between 200 to 300 psig. The withdrawn liquid $CO_2$ flows through the solenoid valve 80 which is controlled by pressure switches 26 to maintain the $CO_2$ pressure in tank 47 at 90 psig. The liquid $CO_2$ is reduced in pressure by the control valve 83 and is evaporated in the heat exchanger 67 by the condensing R508B refrigerant. The liquid $CO_2$ refrigerant flow is controlled by the gas supply valve 24 at a rate determined primarily by the rate at which $CO_2$ is frozen into pellets within the chambers 18. The pressure relief valve 82, set at 400 psig, protects the inlet line from over-pressurization, the relief valve 38, set at 150 psig, protects the tank 47 from over-pressurization. The low pressure switch 27 prevents gas supply valve 24 from opening if the pressure in the tank 47 starts to drop to the triple pressure thus preventing the liquid $CO_2$ in the system 160 from freezing up.

Within the low-temperature subsystem 172, the R508B refrigerant is compressed by the compressor 65 and is subsequently liquified and subcooled in the heat exchangers 61 and 67. The heat exchanger 67 also serves as a refrigerant receiver, as the R508B charge is sufficient to fill approximately one-half of the heat exchanger 67 with liquid R508B.

The refrigeration of the freezing panels 9A in chamber 18A is accomplished by opening liquid refrigerant valve 71A, thus allowing the refrigerant to flow through TEV 71A and into the corresponding distributor 73. The distributor 73, in turn, splits the refrigerant flow (through capillary tubes 75) into ten approximately equal parallel flows corresponding to the ten freezing coils 11 mounted in the chamber 18A. The refrigerant is evaporated in coils 11 within the chamber 18A thereby absorbing the heat of solidification of the $CO_2$ freezing on the corresponding panel assemblies 9. The evaporated R508B from each coil 11 flows into suction manifold 76A, and then flows through the open suction valve 77A to expansion tank 78 and is returned to the suction inlet of compressor 65, thereby completing the low temperature refrigeration loop. As mentioned herein, two of the chambers 18A, 18B or 18C are in a refrigeration (i.e. pellet-producing) mode at a given time.

As discussed above, the defrost cycle of the R508B loop is used to heat the panel assemblies 9 to cause the $CO_2$ ice to release from the freezing compartments 8 and thereby drop in pellet form toward the bottom of the chamber. During the defrost cycle, the compressed R508B which leaves the oil filter 66 flows through the electric heater 69 which raises the temperature of the R508B from the compressor 65 discharge temperature of approximately 130° F. to 250° F. The electric heater 69 consists of a 2 KW cartridge heater inserted into a copper pipe which has a coil of 0.25 inches of copper refrigeration tubing soldered to its exterior and a thermostatic switch attached to control the temperature.

Upon exiting the hot gas valve 70A, 70B or 70C, the hot gas enters a side port in the corresponding distributor 73A, 73B or 73C and flows (through capillary tubes 75) to the ten coils 11 of the panel assemblies 9. The pressure in the coils is raised above the condensation point because the corresponding suction valve 77A, 77B or 77C is closed, causing the R508B to condense in the coils 11 releasing heat and warming the plate 10 of the panel assemblies 9. The condensed refrigerant thereafter flows through the coils 11 into the exhaust manifold 76A, 76B or 76C. At the bottom of the exhaust manifold (and upstream of the closed suction valve 77A, 77B and 77C), a capillary tube 81AC, 81BA or 81CB carries the condensed refrigerant through check valve 74A, 74B or 74C and back to the distributor 73 of a chamber undergoing a pellet-producing phase so that the condensed refrigerant is evaporated within the coils 11 of the pellet-producing chamber. The evaporated R508B then passes through the exhaust manifold of the pellet-producing chamber, through the open suction valve, into the expansion tank 78 and eventually back to compressor 65.

The expansion tank 78 of the system 160 is designed to provide sufficient volume to contain the expanded R508B refrigerant at pressures below 400 psig during periods when the system 160 is at room temperature. In addition, the bypass valve 68 is connected between the outlet and inlet of the compressor 65 to allow the system pressure to equilibrate at the end of operation. The valve 68 is closed during normal operation.

Typical refrigeration/defrost cycles associated with the system 160 require about thirty minutes of refrigeration followed by fifteen minutes of defrost. Consequently, the control computer 400 can be programmed so that for a first fifteen minute period, two chambers 18A and 18B undergo a pellet-producing phase while chamber 18C undergoes a defrost phase, for a second fifteen minute period, two chambers 18B and 18C undergo a pellet-producing phase while chamber 18A undergoes a defrost phase, and a third fifteen minute period, two chambers 18A and 18C undergo a pellet-producing phase while chamber 18B undergoes a defrost phase. These first, second and third fifteen minute periods are thereafter repeated to continually produce pellets from the chambers. Under these circumstances, the pellets can be released from the hopper 46 every fifteen minutes.

The aforedescribed dry ice pellet-making system 160 is adapted to produce clear, dry ice pellets having 0.125 inch diameter at the rate of about forty pounds per hour with a gas use efficiency of approximately eighty percent. The pellets produced by this system 160 are particularly well-suited for use in a dry ice pellet blasting machine, although other uses of the pellets can be found. The machine uses bulk liquid $CO_2$ as a source of $CO_2$ since liquid $CO_2$ is a readily available commodity.

Systems similar in construction to the aforedescribed system 160 could be designed with alternative panel geometries, compressor configurations and chamber designs. For example, instead of positioning the storage hopper outside of a chamber, a storage hopper could be incorporated within the bottom of a chamber. Still further, a freezing panel assembly for installation within a chamber could be designed for the production of larger ice pellets than those produced with the panel assembly 9 of the system 160. For example, there is shown in FIGS. 7 and 8 a panel assembly, generally indicated 176, which has been designed to produce larger pellets, i.e. ⅜ inches to ¾ inches in diameter, than those produced by the earlier-described panel assembly 9. The panel assembly 176 of FIGS. 7 and 8 is constructed similar to a tube-bank heat exchanger and includes an array of pellet-growing tubes 90 which are somewhat frusto-conical in shape having side surfaces which are tapered from a larger, open bottom end toward the smaller upper end at the rate of about ¼ inch per linear foot, i.e. the diameter of the bottom end of the tube is larger than the diameter of the other upper end by ¼ inch per foot of length. The taper of the tubes 90 in this manner facilitates the release of the ice pellet during a defrost phase of the operation.

The tubes 90 of the depicted panel assembly 176 are of a length equal to the desired pellet length plus an additional length on each end to allow for thermal insulation of the end of the tube from the surrounding refrigerated section. The tubes 90 are constructed of stainless steel which is brazed or welded into a set of four stainless steel plates with holes stamped to accept the tubes 90 fitted therein. The assembly 176 also includes a top plate 89, a bottom plate 93, an upper refrigerant enclosure plate 91 and a lower refrigerant enclosure plate 92. The spacing between the refrigerant plates 91 and 92 is approximately the desired length of the ice pellet to be formed. The spacing between top plate 89 and enclosure plate 91 is sufficient to provide for a relatively low thermal conduction path along tubes 90 between the top plate 89 and the refrigeration plate 91, which in this case is approximately one tube 90 diameter. Likewise, the spacing between plates 92 and 93 is sufficient to provide for a relatively low thermal conduction path along the tubes 90 between the bottom plate 93 and the lower refrigeration plate 92, which in this case is approximately one tube 90 diameter.

The refrigeration plates 91 and 92 are brazed or welded to refrigeration side plates 99, 102, 103, 104 which enclose all sides, thus forming a closed interior refrigeration space 101 between plates 91, 92, 99, 102, 103, 104, and the tubes 90 for the passage of refrigerant over the exterior of tubes 90 between plates 91 and 92. A refrigerant entrance tube 94 permits refrigerant to enter the space 101, and the tube 94 is welded into plate 99. An exhaust tube 97 is welded into plate 102 and extends out of space 101. Top plate 89 and bottom plate 93 are enclosed on all sides by side plates 100, 88, 106, and 107, thus forming an insulation interior space 105 between the refrigeration plates 91, 92, 99, 102, 103, 104, outer plates 89, 93, 100, 89, 106, 107 and tubes 90 wherein the insulation interior space 105 completely surrounds refrigeration interior space 101. Refrigeration entrance tube 94 passes through and is welded to plate 100, and exhaust tube 96 passes through and is welded to plate 102.

A defrost gas entrance tube 95 is connected to the plate 100, and the defrost exhaust tube 97 is connected to the lower end of plate 88 and to exhaust tube 96 so as to allow condensed refrigerant to drain from space 105 into exhaust tube 96. Sufficient baffling plates (not shown) are provided within refrigeration space 101 to provide for a uniform flow of refrigerant over tubes 90.

The operation of the panel assembly 176 provides for the freezing and release of tapered cylindrical pellets formed within the tapered tubes 90. To this end and in the freezing (pellet-producing) cycle, refrigerant enters tube 94 through a refrigeration valve 110 and passes over the exterior of tubes 90 within space 101, flowing out exhaust tube 96 through an open suction valve 108. In addition, the defrost tube 95 is closed by a defrost valve 111 during this freezing cycle. The insulation space 105 is connected to the exhaust tube 96 through the tube 97 which is filled with stagnant refrigeration gas at the suction pressure. Since refrigeration gases have relatively poor thermal conductivity, the insulation space 105 reduces heat transfer from the outer plates 89, 93 to the inner refrigeration plates 91, 92. The refrigeration of the space 101 causes ice to grow directly from gas in the interior of the tubes 90. During the growth of the ice pellets, each pellet grows from the sidewalls of its tube 90 toward the center thereof but is prevented from growing to either of the ends of the tubes 90 by the thermal insulation provided by the insulation space 105 about the ends of the tubes 90.

When the pellets are grown to the desired size within the tubes 90, the panel assembly 176 is defrosted by closing the suction valve 108 and refrigeration valve 110 and opening the hot gas defrost valves 111 and 112. The pressure within the spaces 101 and 105 rises and the refrigerant condenses on all the cold surfaces, including those in space 105, thereby warming the tube surfaces and causing the ice forms to release and fall out of tubes 90. Any liquid which condenses in spaces 101 and 105 flows out through tubes 96 and 97 and through capillary tube 109 to refrigerate another panel assembly 176 undergoing an ice- growing phase. A design variation of the panel assembly 176 would be to have tubes 90 terminate at refrigeration panel 91 rather than passing through the upper plate 89. However, an advantage provided by the connection of tubes 90 to the plate 89 is that plate 89 can be of thinner material and still withstand the refrigerant pressure since tubes 90 aid in the support of the plate 89.

Figure 9:
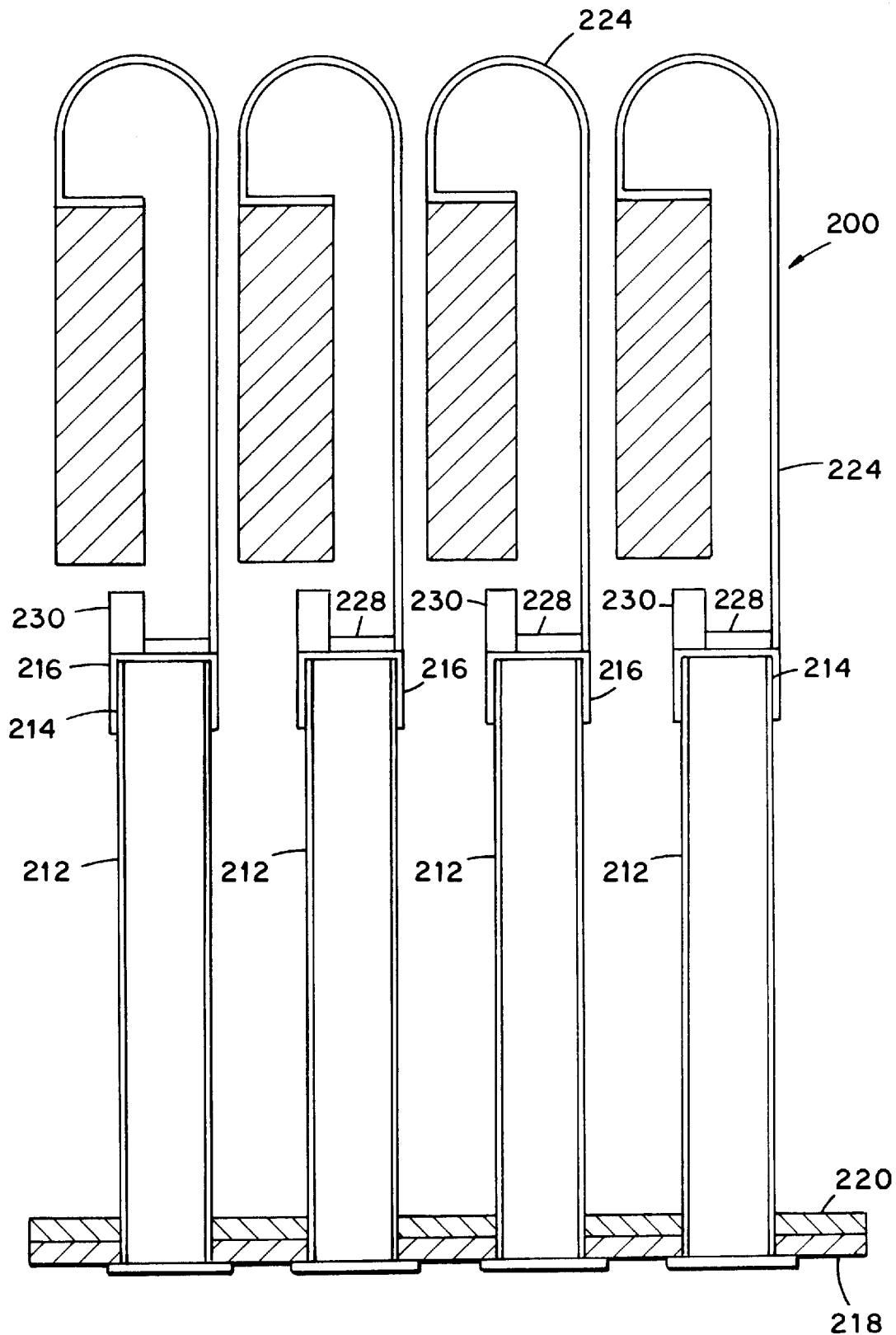
FIG. 9 is a view similar to that of FIG. 1 illustrating an alternative freezing panel assembly used to produce ice pellets from hydrogen in accordance with the process of the present invention.
Figure 10:
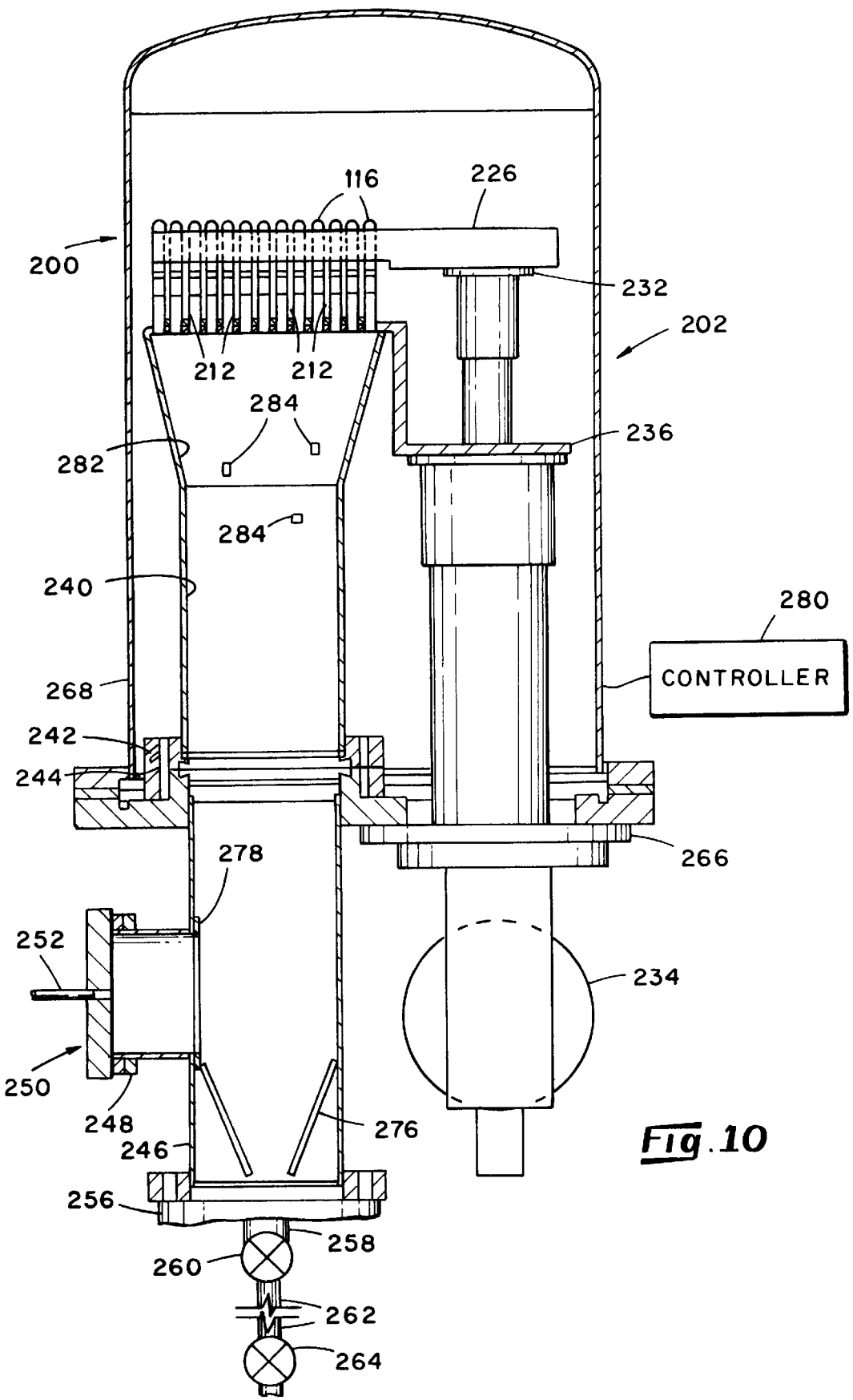
FIG. 10 is a schematic plan view, shown partially in section, of an embodiment of the system of the present invention within which the panel assembly of FIG. 9 is utilized.

With reference to FIG. 9, there is illustrated an arrangement of freezing panel assemblies, generally indicated 200, capable of being used for producing pellets of frozen hydrogen within a system 202 depicted in FIG. 10. Each panel assembly 212 includes a deep drawn 305 stainless closed tube 212 having an outer diameter of 0.25 inches, a wall of 0.012 inches thickness, and a length of 1.5 inches. In addition, each panel assembly 200 includes one-hundred and twenty-seven downwardly-opening tubes 212 arranged in a hexagonal array at the top of a pellet growing chamber 282 and wherein adjacent tubes are spaced 0.4 inches apart. Each tube 212 has a closed end portion 214 which is plated across its ends and along a short distance along the sides thereof with a copper cap 216 having a thickness of 0.006 inches. Each tube 212 also has an open end which is brazed into a 304 stainless steel manifold plate 218 having a thickness of 0.25 inches and a diameter of 6.0 inches. The plate 218 is provided with holes for accepting the tubes 212 positioned therein. Brazed to the top of the manifold plate 218 is a copper plate 220 having a thickness of 0.125 inches and which is also drilled to accept the tubes 212 inserted therethrough. Soldered upon each copper cap 216 is a thermal conduction strip 224 which is made from high purity copper foil of dimensions measuring 0.020 inches in thickness, 0.125 inches in width and 2.0 inches in thickness.

The other end of each strips 224 is soldered to a cold copper plate 226 having a thickness of 0.75 inches.

Attached to each conductor strip 224 directly over each copper cap 216 is a small thick-film resistance heater 228. Furthermore, there is attached to each strip 224, also over each cap 216 and adjacent to heater 228, is a diode thermometer 230. The thermometer 230 and heater 228 are both attached to the strips 224 with a filled epoxy resin (Stycast 2850). The cold plate 226 is bolted to a second stage head 232 (FIG. 10) of a Gifford/McMahon type refrigerator 234 which can produce temperature below 8° K. In addition, a cold plate 220 is bolted to a first stage of a head 236 of the refrigerator 234 capable of producing temperatures down to 30° K. The manifold plate 218 is welded to a tube 240 which is, in turn, connected to vacuum flange 242. This flange 242 is bolted to a base plate 244 provided with a hole for accepting the flange 242. Directly opposite the flange 242 and welded to the base plate 244 is a vacuum Tee 246. A gas entrance side port 248 provided in the Tee 246 is closed with a gas feed flange 250. Gas feed tube 252 is attached to a flange 250. The bottom port of Tee 246 is closed by a reducing flange 256, the outlet port 258 of which is 0.75 inches in diameter. Connected to the port 258 is a gate valve 260 which is connected to a transfer chamber tube 262.

Furthermore, a release valve 264 is connected to the bottom end of tube 262, and a mounting flange 266 of the refrigerator 234 is bolted to the base plate 244 which is, in turn, bored to allow the refrigerator 234 to pass through it. A metal bell jar 268 covers and is bolted to the base plate 244 thereby enclosing the cold heads 232 and 236 and the freezing panel assembly 200. The volume within the bell jar 268 is evacuated by a pump (not shown) to produce vacuum thermal insulation of the components positioned within the bell jar 268. To further insulate the cold heads 232 and 236 and the freezing panel assembly 200, the components positioned within the bell jar 268 are wrapped with a blanket (not shown) of aluminized mylar film superinsulation (not shown). For purposes of directing frozen hydrogen pellets into the port 258, a funnel 276 is placed above the port 258 and beneath the pellet assembly 200. To prevent pellets from bouncing out of the gas entrance port 248, a screen 278 is placed over the port 248 wherein the mesh of the screen is smaller than the pellets being produced. Each heater 228 and each thermometer 230 is connected to electronic multiplexer circuits (not shown) designed to address and actuate each heater 228 and measure each thermometer 230 from a computer control station 280.

In preparation of the system 202 for operation, the hydrogen chamber 240 and the bell jar 268 are both pre-evacuated with an external pump (not shown). The refrigerator 234 is then turned on thereby starting the cooldown of the panel assemblies 200. Following a cooldown period of about two hours, one cold head 232 reaches a temperature at or below 8° K. and the other cold head 236 reaches a temperature of 30° K. Hydrogen gas is supplied continuously through gas supply tube 252 at a desired rate, for example 20 TorrLiters/second, thereby raising the pressure in the chamber 282 to a value above 0.1 Torr which is the vapor equilibrium temperature at hydrogen at 8° K. The hydrogen begins freezing in the freezing tubes 212 in region directly beneath the caps 216. As the ice grows within the tubes 212, the pressure within the chamber 282 increases to a value near 10 Torr, at which the vapor equilibrium temperature of hydrogen is 11.5° K. The heat of solidification of the hydrogen ice is carried to the cold head 232 through the copper strips 224. After a period of time of approximately ten minutes, the pellets in the freezing tubes 212 are grown to desired size.

At this time, sequential release of the pellets is initiated wherein one pellet 284 (FIG. 10) is released from the tubes 212 about every seven seconds upon application of a voltage pulse to its associated heater 228. The heat from the heater 228 raises the temperature of the cap 216 to a temperature of approximately 20° K. so that the pellet 284 is released from the tube 212. The strip 224 is designed to limit the thermal conduction therethrough so that during the heat pulse of a single heater 228, the cold head 232 and thereby the rest of the freezing tubes 212 are increased in temperature by only approximately 0.1° K.

The manifold 218 is maintained near 30° K. by the cold plate 220 which is connected to the first stage 236 of the refrigerator 234. Therefore, hydrogen gas which enters the freezing tubes 212 is cooled when it comes into contact with the manifold 218. A pellet 284 which has been released from a tube 212 falls down and is guided by a funnel 276 through an open valve 260. Pellets can then be transferred to a storage chamber (not shown) operating at a substantially different pressure by sequencing load lock valves 260 and 264. Alternatively, valves 260 and 264 can remain open to drop the pellets directly into the loading mechanism of a centrifugal hydrogen pellet accelerator (not shown) operating in a chamber at the same pressure as chamber 240 and used, for example, to inject frozen pellets into a fusion reactor. To prevent wayward pellets from bouncing into the gas inlet port 248, the port 248 is preferably covered with the screen 278.

Following the release of a pellet 284 from a tube 212, the cap 216 is re-cooled by conduction through strip 224 so that a new pellet begins to grow. By the time the system 200 sequences through (i.e. releases the pellets from) the one-hundred and twenty-seven tube cells, another pellet has been fully grown and is ready for release. In this manner, hydrogen continuously flows into chamber 240 as a gas, is manufactured into ice pellets by reverse sublimation in tubes 212 and out of chamber 240 as pellets through valves 260 and 264.

Figures 11, 12:
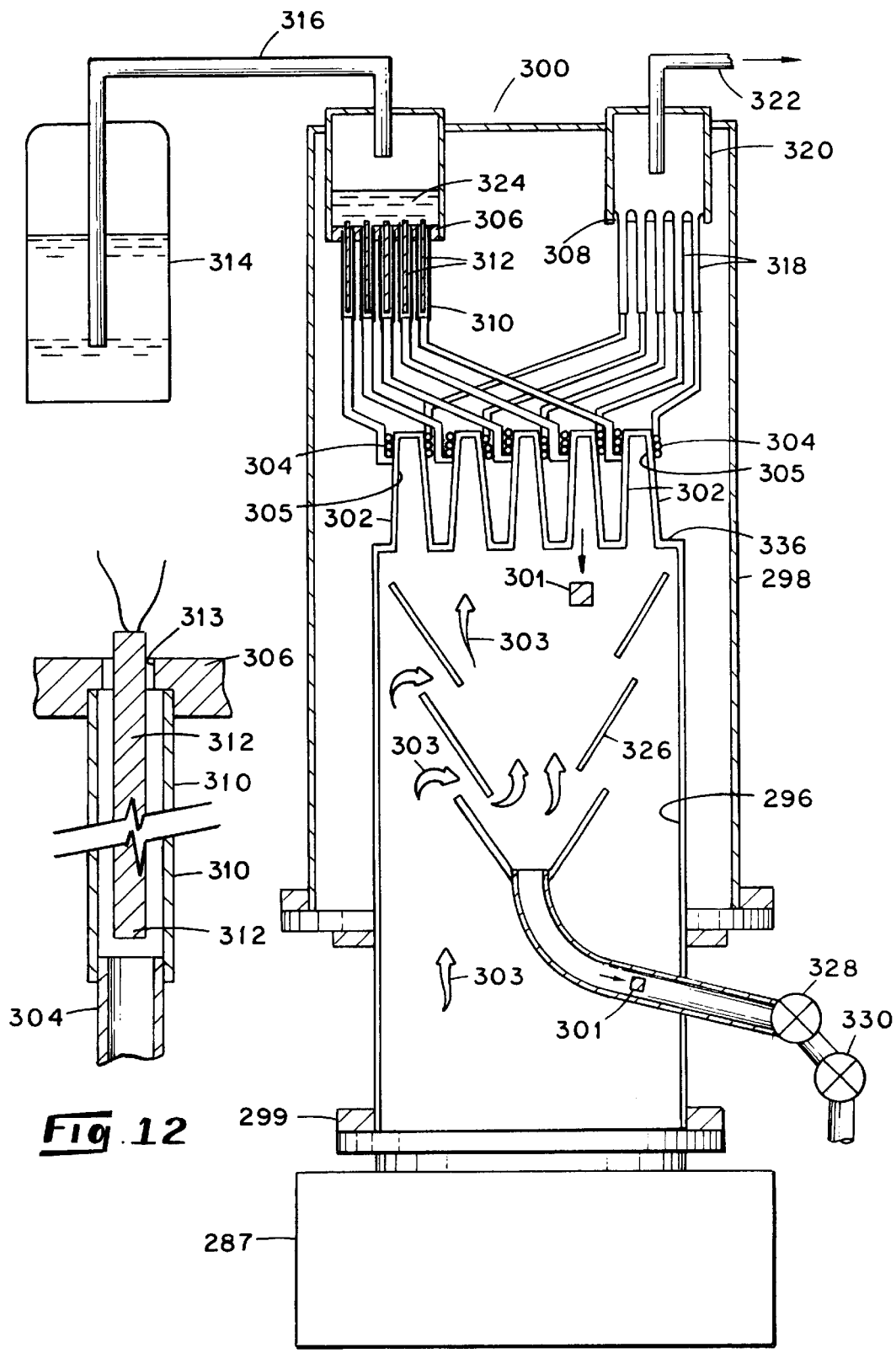
FIG. 11 is a schematic plan view of still another embodiment of the system of the present invention which pumps hydrogen isotopes and produces pellets as the exhaust product.
FIG. 12 is a view of a fragment of the FIG. 11 embodiment drawn to a slightly larger scale.

With reference to FIG. 11, there is schematically shown an alternative hydrogen pellet fabrication machine, generally indicated 300, designed to use liquid helium for controlling the temperature of the freezing compartment surfaces. System 300 is further designed to pump hydrogen and the hydrogen isotopes deuterium and tritium from a process such as a fusion reactor and to manufacture hydrogen isotope pellets for refueling the reactor chamber. In this FIG. 11 system 300, there is provided a substantially-enclosed chamber 296 within which hydrogen is introduced through pump entrance flange 299 from a process chamber 287. Enclosing the top of chamber 296 is a plate 336 into which a plurality of freezing cells, or tubes 302, are brazed. These tubes 302 are constructed of deep drawn stainless steel and are tapered in shape so as to provide a downwardly-directed open end which is wider at the bottom of the tube 302 than at the top thereof so as to facilitate the release of hydrogen pellets 301 during a defrost phase of the system operation. In this connection, the tubes 302 are each 0.42 inches in diameter at the closed end, are 0.46 inches in diameter at the open end, are 1.75 inches long and have a 0.012 inch wall thickness. The open end of each tube is brazed into holes in the plate 336. Around the top or closed end of each tube 302 is wrapped and brazed about five turns of a copper capillary tube 304 which is 0.12 inches in diameter with a 0.028 inch wall, thus forming a surface 305 inside each tube 302 under copper tube 304 which extends approximately 0.6 inches down the side from the closed end of each tube 302 so that the surface 305 is in good thermal contact with the tube 304.

Each end of capillary tube 304 extends to an inlet manifold plate 306 and an outlet manifold plate 308.

At the inlet manifold 306, each capillary tube 304 is brazed to a 304 SS (stainless steel) tube 310 having a 3/16 inch outer diameter, a length of 3.0 inches, and a 0.144 inch inner diameter. Each tube 310 is, in turn, brazed to the manifold plate 306. Inserted into each tube 310 (and as best shown in FIG. 12) is a cartridge heater 312 having an outer diameter of 0.1235 inches and a total length of three inches and an unheated section of one inch. Each heater 312 passes through an orifice hole 313 bored in manifold plate 306 which is 0.125 inches in adiameter. The gap formed between the orifice hole 313 and the unheated section of heater 312 functions to meter the flow of liquid helium refrigerant through each capillary tube 304. The manifold plate 306 is welded to a 3.0 inch diameter 304 SS tube which is supplied with liquid helium from a storage dewar 314 through a constant flow transfer tube 316. The other end of capillary tubes 304 are each brazed to tubes 318 which are brazed to the exhaust manifold plate 308. The tubes 318 are of the same design as tubes 310, and the manifold plate 308 is of the same design as the manifold plate 306. The manifold 308 is connected to an exhaust plenum tube 320 which is, in turn, connected to exhaust tube 322.

Operation of the liquid helium refrigeration and heating cycle of hydrogen pellet-fabrication system 300 is described as follows. Liquid helium is supplied to the reservoir 324 by pressurization of dewar 314 causing helium to flow at a rate controlled by the constant flow transfer tube 316 into the helium supply reservoir 324. Liquid helium from reservoir 324 is split into seventy-three substantially equal flows through orifice 313, into each tube 310 flowing over heater 312 and into each capillary tube 304. The liquid helium is evaporated in the capillary tube coil 304 thereby absorbing the heat of solidification of the hydrogen ice growing on freezing surfaces 305 in tubes 302. The helium gas is then exhausted through tubes 318 into the plenum 320 and out through the exhaust tube 322. The release of a ice pellet 301 from a single tube 302 is accomplished by raising the temperature of surface 305 to above 20° K. by applying a voltage to its associated heater 312, thereby evaporating the liquid helium flowing through the tube 310 and raising the temperature of the helium gas flowing therethrough to a temperature substantially above 20° K. The heated helium gas then flows through capillary coil 304 raising the temperature of surface 305 to 20° K. causing ice growing within each tube to be released as a pellet 301 and fall out of the tube 302.

The transport of the hydrogen through hydrogen pellet-fabrication system 300 is described as follows. Hydrogen gas which is to be pumped from the process chamber 287 at an operating pressure below the triple pressure, enters pump chamber 296 through the inlet flange 299 which is a six inch ID copper seal flange. The hydrogen gas entering chamber 296 flows over and through baffle funnels 326 (along paths exemplified by the flow arrows 203) which are maintained at a temperature of approximately 20° K. by a helium gas cooling circuit (not shown). The baffles 326 thus pre-cool the hydrogen gas and cryogenically condense impurity gases present in the hydrogen gas stream onto the surfaces of baffles 326 thus purifying the hydrogen gas stream. The hydrogen gas stream then flows into tubes 302 and reverse sublimates onto freezing surfaces 305. After a time sufficient to form the desired thickness of ice on surfaces 305, heaters 312 are periodically activated in sequence releasing the pellets 301 from the surface 305. The pellets 301 fall out of the tubes 302 and are guided by funnels 326 through the exhaust port 328 and valves 328 and 330. Valve 330 can, for example, be connected to a pellet accelerator (not shown) for re-injection of the hydrogen pellets into the process chamber 287. In this manner, the hydrogen gas from the chamber 287 continuously flows into pump system 300, is purified on baffles 326, is formed into ice pellets 301 on surfaces 305, which are released and re-injected as solid hydrogen pellets into process chamber 287.

It will be understood that numerous modifications and substitutions can be had to the aforedescribed embodiment without departing from the spirit of the invention. For example, although the aforedescribed embodiments have been shown and described for use in producing pellets of carbon dioxide or hydrogen, systems which embody the principles of the present invention can be used for the production of pellets of deuterium, tritium or neon. For example, the table below sets forth a list of gases capable of being converted to pellet form for use in selected applications, and each gas of this list is capable of being used as the gas medium for conversion directly from the gas form to a solid, pellet form by way of a system and process in accordance with the present invention.

| Material | Formula | triple point temp. Kelvin | triple point pressure kilo-Pascals |
| --- | --- | --- | --- |
| argon | A | 83.78 | 68.75 |
| carbon dioxide | $CO_2$ | 216.5 | 518.0 |
| chlorine | Cl | 172.2 | 2 |
| hydrogen | $H_2$ | 14.0 | 7.2 |
| deuterium | $D_2$ | 18.7 | 17.2 |
| tritium | $T_2$ | 20.6 | 21.6 |
| neon | Ne | 24.5 | 46 |
| methane | $CH_4$ | 90.7 | 11.7 |
| silane | $SiH_4$ | 88.1 | 0.13 |
| xenon | Xe | 161.2 | 82 |
| nitrogen | $N_2$ | 63.1 | 12.5 |
| oxygen | $O_2$ | 54.4 | 0.15 |
| ammonia | $NH_4$ | 195.4 | 6.07 |
| silicon fluoride | $SiF_4$ | 183 | 241 |
| hydrogen chloride | HCl | 158.9 | 13.4 |
| ammonia chloride | $NH_4Cl$ | 611 | 100 |
| uranium hexafluoride | $UF_6$ | 337 | 150 |
| arsine | $AsH_3$ | 156.2 | 3.0 |

Accordingly, the aforedescribed embodiments are intended for the purpose of illustration and not as limitation.

I claim:

1. A process for freezing a gas into ice comprising the steps of:
    providing a chamber containing a freezing compartment having at least one surface against which ice is to be formed;
    introducing a gas to be formed into ice into the chamber while maintaining the internal pressure of the chamber at a level which is below the equilibrium triple pressure of the gas;
    lowering the temperature of the at least one surface of the compartment to a temperature which is below the equilibrium vapor pressure temperature of the gas at the chamber pressure so that the gas condenses into ice within the compartment and against the at least one surface thereof; and thereafter
    raising the temperature of the at least one surface of the compartment so that the ice is thereby released from the compartment in solid form for collection or use.

2. The process as defined in claim 1 wherein the freezing compartment has an opening and is arranged within the chamber so that the compartment opening opens generally downwardly and so that the step of raising the temperature permits the ice which is released from the compartment to fall out of the compartment through the opening thereof.

3. The process as defined in claim 1 wherein the step of lowering the temperature of the at least one surface of the compartment involves a step of pumping a refrigerant through coils disposed in heat exchange relationship with the at least one surface wherein the refrigerant being pumped through the coils during the lowering step lowers the temperature of the at least one surface to a temperature which is lower than the equilibrium vapor pressure temperature of the gas at the chamber pressure.

4. The process as defined in claim 3 wherein the step of raising the temperature of the at least one surface includes a step of directing a refrigerant through the coil at a temperature which is substantially above the equilibrium vapor pressure temperature of the gas in the chamber so that the temperature of the at least one surface is raised by the refrigerant being directed through the coil.

5. The process as defined in claim 1 wherein the step of lowering maintains the temperature of the at least one surface at a temperature which is below the equilibrium vapor pressure temperature of the gas at the chamber pressure for a period of time sufficient for the ice to grow to a desired size against the at least one surface of the compartment, and the step of raising the temperature of the at least one surface of the compartment is carried out at the end of said sufficient period of time.

6. The process as defined in claim 1 wherein the gas being introduced into the chamber is carbon dioxide, the internal pressure of the chamber is maintained within the range of between about 0 and 60 psig during the step of introducing, and the lowering step effects a lowering of the temperature of the at least one surface of the compartment to a temperature of between about −120 and −70° F.

7. The process as defined in claim 1 wherein the interior of the freezing compartment is shaped so that by raising the temperature of the at least one surface of the compartment so that the ice is released from the compartment, the ice is permitted to fall from the compartment under the influence of gravity.

8. The process as defined in claim 1 wherein the gas being introduced within the chamber is one gas of a group consisting of carbon dioxide, hydrogen, deuterium, tritium, neon, argon, chlorine, methane, silane, xenon, nitrogen, oxygen, ammonia, silicon fluoride, hydrogen chloride, ammonia chloride, uranium hexafluoride, and arsine.

9. A process for freezing a gas into ice forms of a predetermined shape and size, the process comprising the steps of:
    providing a chamber having internal freezing surfaces against which the gas is to be formed into ice;
    admitting the gas into the chamber while maintaining the pressure of the gas in said chamber below the equilibrium triple pressure of the gas and lowering the temperature of the freezing surfaces to a temperature below the equilibrium vapor pressure temperature of the gas at the chamber pressure so that the gas condenses directly into ice against the freezing surface; and subsequently
    raising the temperature of the freezing surfaces to evaporate the ice at the interface of the freezing surface and thereby separate the ice from the freezing surfaces.

10. The process as defined in claim 9 wherein the step of admitting gas for the purpose of forming ice against the freezing surfaces and the step of lowering the temperature for the purpose of separating the ice from the freezing surfaces are repeated in sequence so that ice is continually formed against and then separated from the freezing surfaces.

11. The process as defined in claim 9 wherein the freezing surfaces provide a plurality of downwardly-opening freezing compartments within which ice is to be formed during the lowering step, and the step of raising the temperature effects the release of the ice from the freezing surfaces and permits the ice to fall from the freezing compartments under the influence of gravity.

12. The process as defined in claim 11 wherein the plurality of downwardly-opening freezing compartments is a first set of freezing compartments, and the freezing surfaces provide a second set of downwardly-opening freezing compartments, and the step of admitting and the subsequent step of lowering are performed with each set of freezing compartments so that ice is formed against the freezing surfaces of the first and second freezing compartments and then subsequently separated therefrom.

13. The process as defined in claim 12 wherein the steps of admitting and lowering are coordinated with one another so that ice is separated from the freezing surfaces of one set of freezing compartments while ice is being formed against the freezing surfaces of the other set of freezing compartments.

14. A system for freezing gas into ice comprising:
a chamber having a freezing compartment having at least one surface against which the ice is to be formed;
means for introducing a gas to be formed into ice into the chamber while maintaining the internal pressure of the chamber at a level which is below the equilibrium triple pressure of the gas;
means for lowering the temperature of the at least one surface of the compartment to a temperature which is below the equilibrium vapor pressure temperature of the gas at the chamber pressure so that the gas condenses into ice within the compartment and against the at least one surface thereof; and
means for raising the temperature of the at least one surface of the compartment following the production of ice against the surface of the compartment so that the ice is thereby released from the compartment for collection or use.

15. The system as defined in claim 14 wherein the freezing compartment has an opening and is shaped and arranged within the chamber so as to open generally downwardly so that upon release of the ice from the compartment, the ice is permitted to fall from the compartment through the opening thereof.

16. The system as defined in claim 15 wherein the chamber includes a plurality of freezing compartments arranged within the chamber, and each of the freezing compartments has at least one surface against which ice is to be formed so that by condensing ice within the compartments and subsequently releasing the ice from the compartment produces a plurality of ice pellets within the chamber.

17. The system as defined in claim 16 wherein the chamber includes a plurality of panel assemblies supported within the chamber in a stacked relationship, and the freezing compartments are embodied within the panel assemblies.

18. The system as defined in claim 16 wherein the means for lowering the temperature of the at least one surface includes a cascade refrigeration system including a low-temperature refrigeration coil which is in heat exchange relationship with the at least one surface of the compartment and means for pumping a refrigerant medium through the coil to cool the temperature of the at least one surface to a temperature which is below the equilibrium vapor temperature of the gas in the chamber.

19. The system as defined in claim 18 wherein the means for raising the temperature of the at least one surface includes means for directing a refrigerant through the coil wherein the refrigerant is at a temperature which is substantially above the equilibrium vapor pressure temperature of the gas in the chamber so that the temperature of the at least one surface is raised by the refrigerant directed through the coil.

20. The system as defined in claim 15 further comprising a storage receptacle positioned below the chamber, a flow conduit which is joined between the chamber and the storage receptacle for routing ice, under the influence of gravity, which has been released from the compartment through the bottom of the chamber and into the storage receptacle, and a flow transfer valve connected in-line with the flow conduit for selectively isolating the internal pressures of the chamber and storage receptacle from one another to accommodate the removal of ice from the storage receptacle without affecting the production of ice within the chamber.

21. The system as defined in claim 15 wherein the at least one surface is provided by a copper plate, and the remaining surfaces of the compartment are provided by the interior walls of a honeycomb cell.

22. The system as defined in claim 15 wherein the chamber includes a plurality of freezing panel assemblies supported within the chamber, and each freezing panel assembly includes a plurality of freezing compartments having at least one surface against which ice is to be formed, each panel assembly including a copper plate which provides the at least one surface of each freezing compartment and a honeycomb structure attached to the copper plate having a plurality of cells, and wherein each compartment of a freezing panel assembly has interior walls which are provided by a surface of the corresponding copper plate and the interior walls of a cell of a honeycomb structure.

23. The system as defined in claim 22 wherein each cell has an opening out of the side thereof opposite the copper plate, the honeycomb structure has a core which is constructed of a material possessing a lower thermal conductivity than copper so that during the formation of ice within the chamber, ice forms against the copper surfaces before it forms upon the exposed portion of the cell core and thereby reduces the likelihood that the ice being formed in one cell will bridge the wall of the one cell and join with the ice being formed in an adjacent cell.

24. The system as defined in claim 14 wherein a plurality of downwardly-opening tubes supported within the chamber and each tube provides a freezing compartment within which ice is to be formed and from which the ice is to be subsequently released.

25. The system as defined in claim 14 further comprising a control computer for controlling the operation of the temperature-raising means and the temperature-lowering means so that following the release of the ice from the freezing compartment by the temperature-raising means, the temperature-lowering means is energized to begin to form additional ice within the freezing compartment.

26. The system as defined in claim 14 wherein the gas being introduced within the means for introducing includes means for introducing one gas of a group consisting of carbon dioxide, hydrogen, deuterium, tritium, neon, argon, chlorine, methane, silane, xenon, nitrogen, oxygen, ammonia, silicon fluoride, hydrogen chloride, ammonia chloride, uranium hexafluoride, and arsine.

27. The system as defined in claim 16 wherein the plurality of freezing compartments is a first set of freezing compartments, the system includes a second set of freezing compartments having freezing surfaces against which gas is to be formed into ice, and the introducing and lowering means are adapted to effect the formation of ice from the gas against the freezing surfaces of the second set of freezing compartments, and the means for raising the temperature is adapted to release the ice formed in the first and second set of freezing compartments so that ice is formed in both the first and second set of freezing compartments.

28. The system as defined in claim 27 wherein the formation of ice within one set of freezing compartments is coordinated with the release of the ice from the other set of freezing compartments so that ice is released from the freezing compartments of one set while ice is being formed in the freezing compartments of the other set.

29. The system as defined in claim 16 wherein each freezing compartment has an independent heating means so that individual ice pellets can be released from one freezing compartment while the remaining freezing compartment remain in a pellet-producing phase.

30. The system as defined in claim 16 further comprising means for purifying the gas being admitted so that the ice forms produced are of a higher purity than the incoming gas.

* * * * *